(12) United States Patent
Hideshima

(10) Patent No.: US 11,420,371 B2
(45) Date of Patent: Aug. 23, 2022

(54) MATERIAL PLASTICIZING DEVICE

(71) Applicant: Seiko Epson Corporation, Tokyo (JP)

(72) Inventor: Yasutoshi Hideshima, Matsumoto (JP)

(73) Assignee: Seiko Epson Corporation

( * ) Notice: Subject to any disclaimer, the term of this patent is extended or adjusted under 35 U.S.C. 154(b) by 409 days.

(21) Appl. No.: 16/520,444

(22) Filed: Jul. 24, 2019

(65) Prior Publication Data
US 2020/0031037 A1    Jan. 30, 2020

(30) Foreign Application Priority Data

Jul. 25, 2018    (JP) .............................. JP2018-139329

(51) Int. Cl.
 B29C 45/47    (2006.01)
 B29C 45/73    (2006.01)
 B29C 45/60    (2006.01)

(52) U.S. Cl.
 CPC .............. B29C 45/47 (2013.01); B29C 45/60 (2013.01); B29C 45/73 (2013.01)

(58) Field of Classification Search
 CPC ..... B29C 64/245; B29C 64/255; B29C 45/47; B29C 48/515; B29C 64/241; B29C 64/209
 See application file for complete search history.

(56) References Cited

U.S. PATENT DOCUMENTS

| | | |
|---|---|---|
| 3,137,034 A | 6/1964 | Adams |
| 3,248,755 A | 5/1966 | Plymale |
| 2017/0210069 A1* | 7/2017 | Stubenruss ........... B29C 64/118 |
| 2018/0297258 A1 | 10/2018 | Zhu |
| 2020/0114582 A1* | 4/2020 | Hideshima ............ B29C 64/241 |
| 2020/0139629 A1* | 5/2020 | Yokota .................. B29C 64/314 |

FOREIGN PATENT DOCUMENTS

| | | |
|---|---|---|
| CN | 106696212 A | 5/2017 |
| DE | 6802092 U | 2/1969 |
| DE | 10-2009-049675 A1 | 6/2011 |
| JP | 2009-137260 A | 6/2009 |
| JP | 2011-020378 A | 2/2011 |
| JP | 2017-523934 A | 8/2017 |

* cited by examiner

*Primary Examiner* — Alison L Hindenlang
*Assistant Examiner* — Debjani Roy
(74) *Attorney, Agent, or Firm* — Harness, Dickey & Pierce, P.L.C.

(57) ABSTRACT

The material plasticizing device includes a rotor having a material introduction portion open on an outer peripheral side surface, and a groove forming surface on which a scroll groove kneading a material introduced from the material introduction portion is formed; a case that surrounds an outer periphery of the groove forming surface; a facing portion having a facing surface that faces the groove forming surface, a heater that heats the material in the scroll groove, and a communication hole through which the material plasticized by a heat of the heater flows; and a material supply source that stores the material, in which a coupling pipeline is formed in the case, a material supply path is formed by the case and the outer peripheral side surface of the rotor, and the material flows into the material introduction portion through the coupling pipeline and the material supply path.

8 Claims, 19 Drawing Sheets

MATERIAL PLASTICIZING DEVICE

The present application is based on, and claims priority from, JP Application Serial Number 2018-139329, filed Jul. 25, 2018, the disclosure of which is hereby incorporated by reference herein in its entirety.

BACKGROUND

1. Technical Field

The present disclosure relates to a material plasticizing device.

2. Related Art

As material plasticizing devices, a device that applies heat and plasticizes, that is, melts materials used in injection molding and three-dimensional shaping is known. In addition, there is a type of device in which a long screw whose longitudinal direction is a rotation axis direction and which is incorporated inside a cylinder and is used in the related art is replaced with a rotor whose size in the rotation axis direction is miniaturized in order to miniaturize the device among the material plasticizing devices. For example, in JP-A-2011-20378, a material plasticizing device is disclosed which is mounted on an injection molding machine and which allows a shaping material supplied to a scroll groove of a rotor to flow while plasticizing the shaping material by heating by a heater and rotation of the rotor and to flow into a mold cavity. In the material plasticizing device in JP-A-2011-20378, the shaping material is supplied into the scroll groove from an end portion of the scroll groove open on an outer peripheral side surface of the rotor.

Among the material plasticizing devices that plasticize the material using the rotor as described above, there is a device in which the material is introduced into the scroll groove, when the end portion of the scroll groove reaches a predetermined position by rotation of the rotor and is coupled to a coupling pipeline supplying the material. In such a material plasticizing device, a pressure in the scroll groove may vary and a flow rate of material after the plasticizing may vary between until the end portion of the scroll groove is coupled to the coupling pipeline and when the end portion is coupled to the coupling pipeline.

SUMMARY

According to an aspect of the present disclosure, there is provided a material plasticizing device including a rotor having a material introduction portion open on an outer peripheral side surface, and a groove forming surface on which a scroll groove kneading a material introduced from the material introduction portion is formed; a case that surrounds an outer periphery of the groove forming surface; a facing portion having a facing surface that faces the groove forming surface, a heater that heats the material in the scroll groove, and a communication hole through which the material plasticized by a heat of the heater flows; and a material supply source that stores the material, in which a coupling pipeline is formed in the case, a material supply path is formed by the case and the outer peripheral side surface of the rotor, and the material flows into the material introduction portion through the coupling pipeline and the material supply path.

DESCRIPTION OF EXEMPLARY EMBODIMENTS

1. First Embodiment

Figure 1:
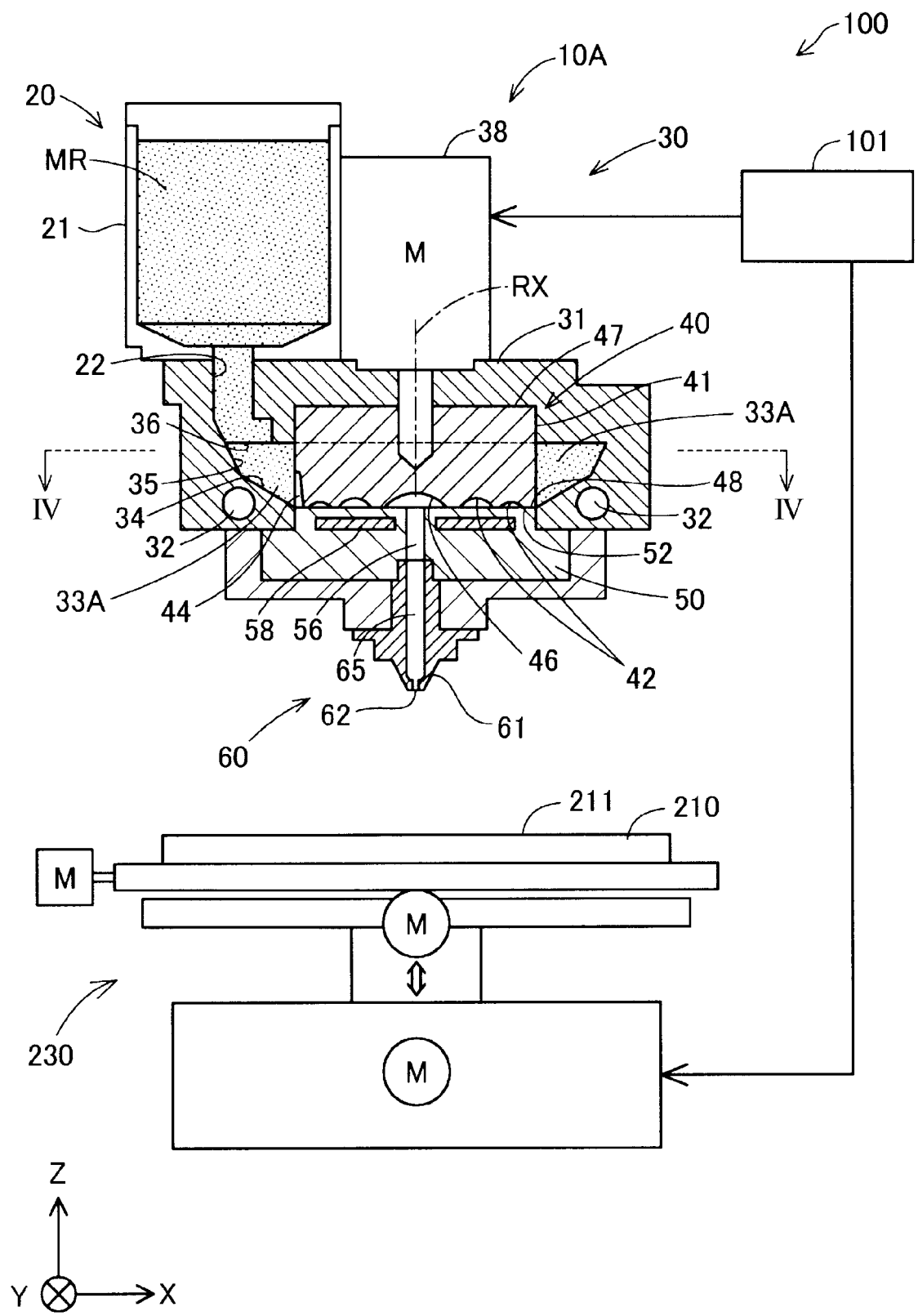
FIG. 1 is a schematic view illustrating a configuration of a three-dimensional shaping apparatus provided with a material plasticizing device according to a first embodiment.

FIG. 1 is a schematic view illustrating a configuration of a three-dimensional shaping apparatus 100 provided with a material plasticizing device 10A according to a first embodiment. In FIG. 1, arrows indicating X, Y, and Z directions orthogonal to one another are illustrated. The X direction and the Y direction are directions parallel to a horizontal plane, and the Z direction is a direction opposite to a vertical direction, and a direction opposite to a gravity direction. Arrows indicating the X, Y, and Z directions are appropriately illustrated so that the illustrated directions correspond to those in FIG. 1 also in other reference drawings.

The three-dimensional shaping apparatus 100 shapes a three-dimensional shaping object by depositing a shaping material plasticized by the material plasticizing device 10A. "Plasticizing" means that heat is applied to a material having thermoplasticity to melt the material. Hereinafter, the "three-dimensional shaping apparatus" is also simply referred to as a "shaping apparatus", and the three-dimensional shaping object is also simply referred to as a "shaping object". The "shaping material" will be described later.

The material plasticizing device 10A is provided with a supply unit 20 that supplies a raw material MR that is a material before being converted into a shaping material, and a generation unit 30 that converts the raw material MR into the shaping material. The supply unit 20 is provided with a material supply source 21 that stores the raw material MR, and a coupling pipeline 22 that leads the raw material MR of the material supply source 21 to a material supply path 33A of the generation unit 30.

The material supply source 21 is configured to include, for example, a hopper that stores the raw material MR. The material supply source 21 has a discharge port on a lower side. The discharge port is coupled to the generation unit 30 via the coupling pipeline 22. In the first embodiment, the raw material MR is introduced into the material supply source 21 in the form of pellets, powder or the like.

The generation unit 30 generates a paste-like shaping material which is melted and exhibited fluidity by plasticizing the raw material MR supplied from the material supply source 21, and guides the material to an ejecting portion 60. The generation unit 30 includes a case 31, a refrigerant flow path 32, the material supply path 33A, a drive motor 38, a flat screw 40 which is an aspect of a rotor, and a facing portion 50.

The case 31 has a recessed portion that opens downward, and stores the rotor in the recessed portion. In the first embodiment, the case 31 stores the flat screw 40 as a rotor. Hereinafter, the case 31 is also referred to as a "screw case 31". The screw case 31 covers an outer peripheral side surface 41 and an upper surface 47 of the flat screw 40. In the screw case 31, the material supply path 33A is formed by the outer peripheral side surface 41 of the flat screw 40 which is one aspect of the rotor.

The material supply path 33A is a transport path of the raw material MR, the material supply path 33A being provided in an outer peripheral region surrounding the outer peripheral side surface 41 of the flat screw 40. The coupling pipeline 22 of the supply unit 20 is coupled to the material supply path 33A from above. The raw material MR of the material supply source 21 flows into the material supply path 33A through the coupling pipeline 22 by gravity. The details of the material supply path 33A will be described later.

The refrigerant flow path 32 is provided below the material supply path 33A in the screw case 31. The refrigerant flow path 32 is formed along the outer peripheral side surface 41 of the flat screw 40 so as to surround the outer periphery of the flat screw 40 when viewed in the Z direction. A refrigerant is supplied to the refrigerant flow path 32 from a refrigerant supply unit (not illustrated). The temperature of the raw material MR in the material supply path 33A is prevented from rising due to a heat of a heater 58 of the facing portion 50 or a heat generated by the flat screw 40 due to the heat exchange with the refrigerant of the refrigerant flow path 32.

The drive motor 38 is disposed above the screw case 31. The drive motor 38 is connected to the upper surface 47 of the flat screw 40 through a through-hole provided in a top surface portion of the screw case 31. The drive motor 38 is driven under the control of a control unit 101 to rotate the flat screw 40 in the screw case 31.

The flat screw 40 is a type of a rotor that plasticizes and feeds the raw material MR while kneading the raw material MR in the groove by rotation. "Kneading" means kneading while mixing the materials. The flat screw 40 has a substantially cylindrical shape whose height in the axial direction which is a direction along the central axis is smaller than the diameter. The flat screw 40 is disposed such that the axial direction is parallel to the Z direction, and is rotated in a circumferential direction by the rotational drive force generated by the drive motor 38. In the first embodiment, the central axis of the flat screw 40 coincides with a rotation axis RX. In FIG. 1, the rotation axis RX of the flat screw 40 is illustrated by a dotted line.

Figure 2A:
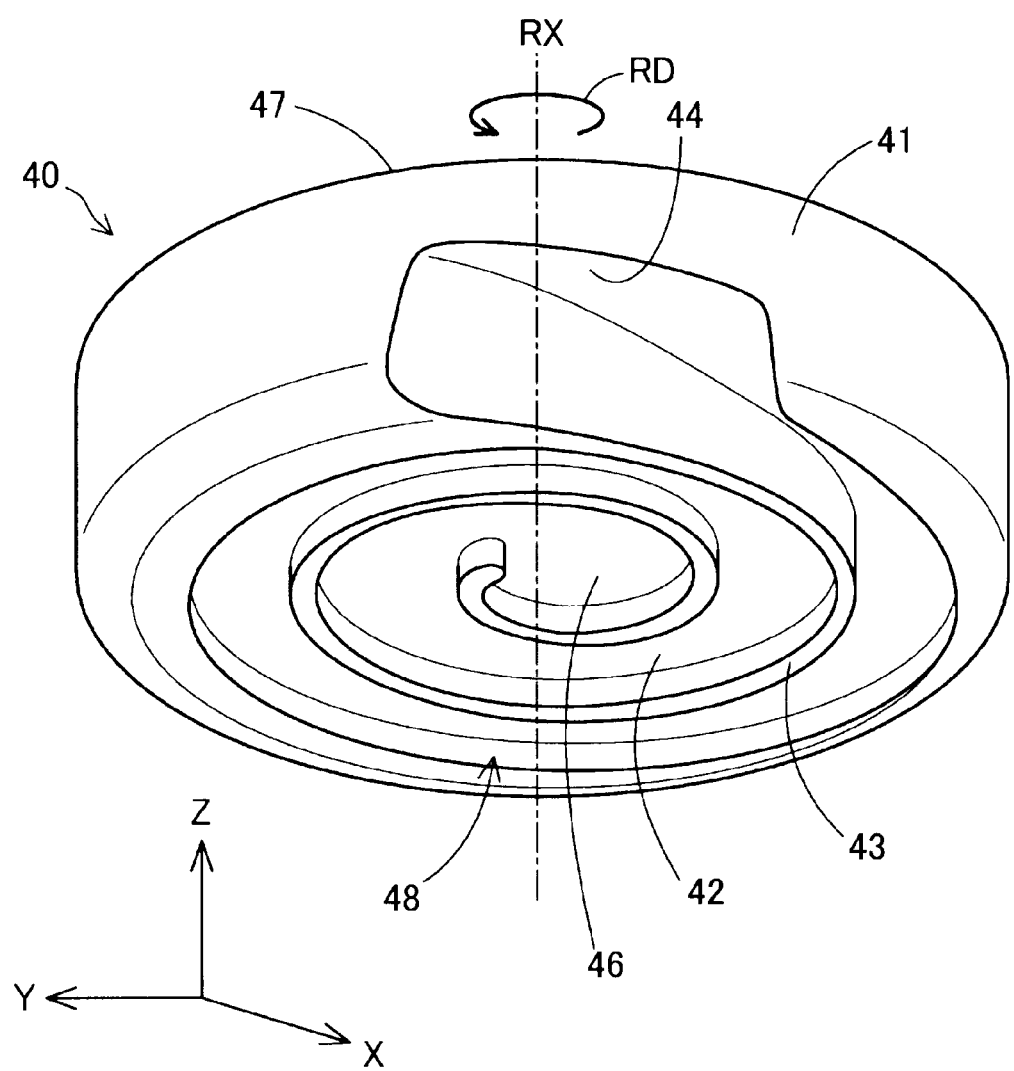
FIG. 2A is a schematic perspective view illustrating a configuration of a flat screw.

A scroll groove 42 is formed on a lower surface 48 intersecting the rotation axis RX of the flat screw 40. Hereinafter, the lower surface 48 of the flat screw 40 is also referred to as a "groove forming surface 48". As illustrated in FIG. 2A to be referred to later, the scroll groove 42 swirlingly extends on the groove forming surface 48 from the outer peripheral side surface 41 toward a central portion 46 through which the rotation axis RX of the flat screw 40 passes.

The groove forming surface 48 of the flat screw 40 faces a facing surface 52 which is an upper surface of the facing portion 50, and a space is formed between the scroll groove 42 and the facing surface 52 of the facing portion 50. Hereinafter, the facing portion 50 is also referred to as a "screw facing portion 50". The raw material MR is introduced into a space in the scroll groove 42 between the flat screw 40 and the screw facing portion 50 through an opening end portion 44 of the scroll groove 42 which is open at the outer peripheral side surface 41 of the flat screw 40 from the material supply path 33A. Hereinafter, the opening end portion 44 of the scroll groove 42 is also referred to as a "material introduction portion 44". Specific configurations of the flat screw 40 and the scroll groove 42 thereof will be described later.

The screw facing portion 50 has the facing surface 52 which is an upper surface facing the groove forming surface 48 of the flat screw 40. Hereinafter, the facing surface 52 of the screw facing portion 50 is also referred to as a "screw facing surface 52". In the screw facing portion 50, the heater 58 is embedded below the screw facing surface 52 for heating the raw material MR supplied in the scroll groove 42 of the rotating flat screw 40. The raw material MR supplied in the scroll groove 42 is kneaded and melted in the scroll groove 42, flows along the scroll groove 42 by the rotation of the flat screw 40, and is led to the central portion 46 of the flat screw 40 as a shaping material. The plasticized shaping material flowed into the central portion 46 flows out from the generation unit 30 through a communication hole 56 that is provided at the center of the screw facing surface 52 and through which the shaping material flows.

The plasticizing of the raw material MR in the generation unit 30 is realized by the heating by the heater 58 and the rotation of the flat screw 40. In the shaping material, all types of substances included in the raw material MR may not be plasticized and melted. The shaping material may be converted into a state of fluidity as a whole by melting at least some types of substances constituting the shaping material. The specific example of the substance constituting the shaping material will be described later.

The shaping apparatus 100 is further provided with the control unit 101 that controls the shaping apparatus 100, the ejecting portion 60 that ejects the shaping material generated by the material plasticizing device 10A, a shaping table 210 as a base of the shaping object, and a movement mechanism 230 that controls an ejection position of the shaping material.

The control unit 101 controls the material plasticizing device 10A, the ejecting portion 60, and the movement mechanism 230 to execute shaping processing of shaping the shaping object. In the first embodiment, the control unit 101 is configured to include a computer including at least one processor and a main storage device. The control unit 101 performs various functions by the processor executing programs and instructions read onto the main storage device. Some of the functions of the control unit 101 may be realized by a hardware circuit.

The ejecting portion 60 ejects the shaping material supplied from the material plasticizing device 10A to a target position on the table 210 under the control of the control unit 101. The ejecting portion 60 is provided with a nozzle 61 which ejects the shaping material, and a flow path 65 which guides the shaping material to the nozzle 61.

The nozzle 61 is coupled to the communication hole 56 of the screw facing portion 50 of the material plasticizing device 10A through the flow path 65. In the first embodiment, the flow path 65 extends along the Z direction, and the flow path 65 and the nozzle 61 are disposed along the Z direction. The flow path 65 may be provided with a valve mechanism for controlling the flow rate of the shaping material. The shaping material generated in the generation unit 30 is ejected toward the table 210 from an ejecting port 62 provided at a tip end of the nozzle 61.

The table 210 is disposed at a position facing the ejecting port 62 of the nozzle 61. In the first embodiment, a surface 211 of the table 210 facing the ejecting port 62 of the nozzle 61 is disposed horizontally, that is, parallel to the X and Y directions. The shaping apparatus 100 shapes a shaping object by repeating processing of depositing the shaping material at a target position on the surface 211 of the table 210, which is predetermined in accordance with the shaping data.

The movement mechanism 230 changes the relative positional relationship between the table 210 and the nozzle 61. In the first embodiment, the position of the nozzle 61 is fixed, and the movement mechanism 230 moves the table 210. The movement mechanism 230 is configured to include a three-axis positioner that moves the table 210 in three axial directions of the X, Y, and Z directions by the drive force of three motors M. The movement mechanism 230 changes the relative positional relationship between the nozzle 61 and the table 210 under the control of the control unit 101.

In other embodiment, instead of moving the table 210 by the movement mechanism 230, a configuration may be adopted in which the movement mechanism 230 moves the nozzle 61 with respect to the table 210 in a state where the position of the table 210 is fixed. Even with such a configuration, the relative position of the nozzle 61 with respect to the table 210 can be changed. In addition, in other embodiment, a configuration may be employed in which the movement mechanism 230 moves the table 210 and the nozzle 61 to change the relative position of both.

FIG. 2A is a schematic perspective view illustrating a configuration of a side of the groove forming surface 48 of the flat screw 40 according to the first embodiment. In FIG. 2A, the position of the rotation axis RX of the flat screw 40 in the generation unit 30 is illustrated by a dotted line. In addition, in FIG. 2A, a rotation direction RD where the flat screw 40 rotates in the generation unit 30 is illustrated. The central portion 46 of the groove forming surface 48 of the flat screw 40 is configured as a recessed portion to which one end of the scroll groove 42 is coupled. The central portion 46 faces the communication hole 56 of the screw facing portion 50 illustrated in FIG. 1 and FIG. 3 to be referred to later. The central portion 46 intersects the rotation axis RX.

The scroll groove 42 of the flat screw 40 swirlingly extends from the material introduction portion 44 open on the outer peripheral side surface 41 of the flat screw 40 so as to draw an arc toward the center, and is coupled to the central portion 46. The scroll groove 42 may be configured to extend in a spiral shape. The groove forming surface 48 is provided with a projecting strip portion 43 that constitutes a side wall portion of the scroll groove 42 and extends along the scroll groove 42. The flat screw 40 according to the first embodiment has one projecting strip portion 43 and one scroll groove 42. The scroll groove 42 is preferably configured such that the cross-sectional area in a cross section orthogonal to the central axis of the scroll groove 42 decreases from the material introduction portion 44 toward the central portion 46. As a result, the pressure in the central portion 46 when plasticizing the raw material MR can be further increased. In the first embodiment, the width and depth of the scroll groove 42 decrease from the material introduction portion 44 toward the central portion 46. The width of the scroll groove 42 is the width in the radial direction of the flat screw 40. The depth of the scroll groove 42 corresponds to the height of the projecting strip portion 43 in the axial direction of the flat screw 40.

Figure 2B:
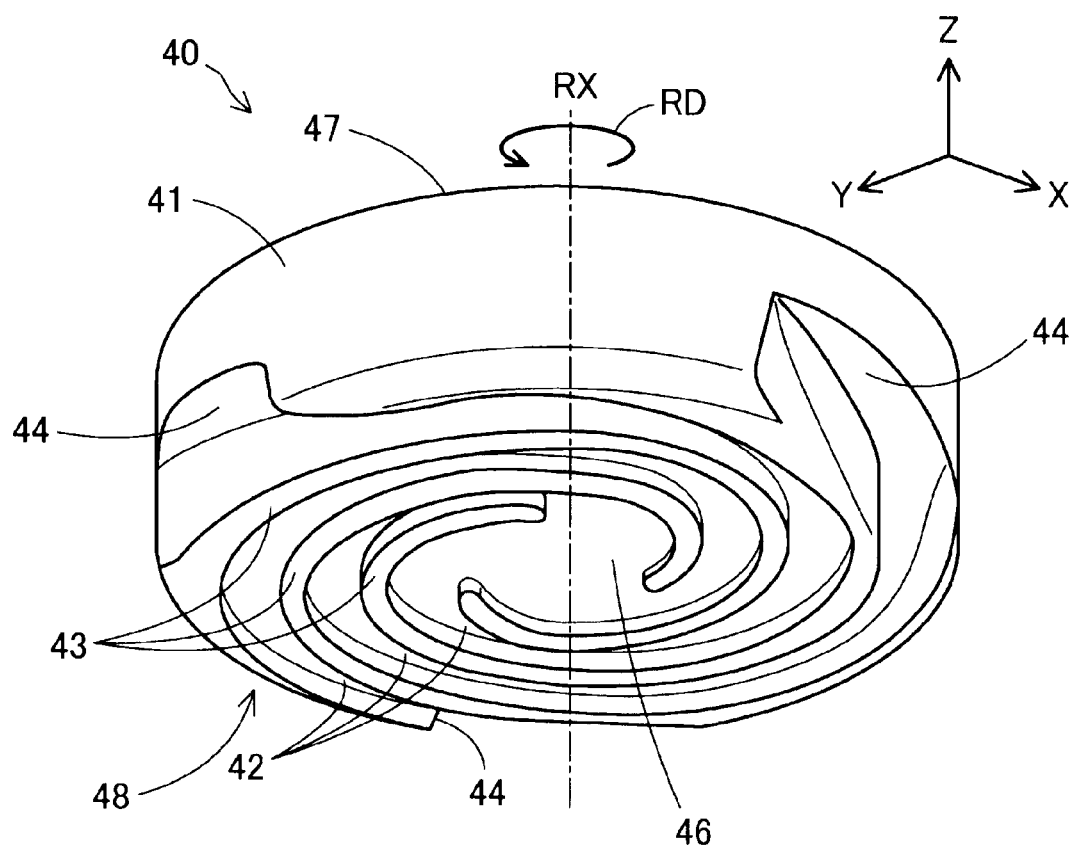
FIG. 2B is a schematic perspective view illustrating another configuration example of the flat screw.

FIG. 2B is a schematic view illustrating another configuration example of the flat screw 40. The number of scroll grooves 42 of the flat screw 40 is not limited to one, and the number of projecting strip portions 43 is not limited to one. In other embodiment, the flat screw 40 may have three scroll grooves 42 and three projecting strip portions 43, as illustrated in FIG. 2B. In addition, the flat screw 40 may have two scroll grooves 42 or may have four or more scroll grooves 42. In addition, the flat screw 40 may be provided with any number of projecting strip portions 43 in accordance with the number of the scroll grooves 42.

In the first embodiment, as illustrated in FIG. 2A, the flat screw 40 is provided with the material introduction portion 44 at only one place on the outer peripheral side surface 41. On the other hand, in other embodiment, as illustrated in FIG. 2B, the material introduction portion 44 may be formed at three places. The number of material introduction portions 44 provided in the flat screw 40 is not limited to one or three. In the flat screw 40, the material introduction portion 44 may be provided at two places, and may be provided at four or more places.

Figure 3:
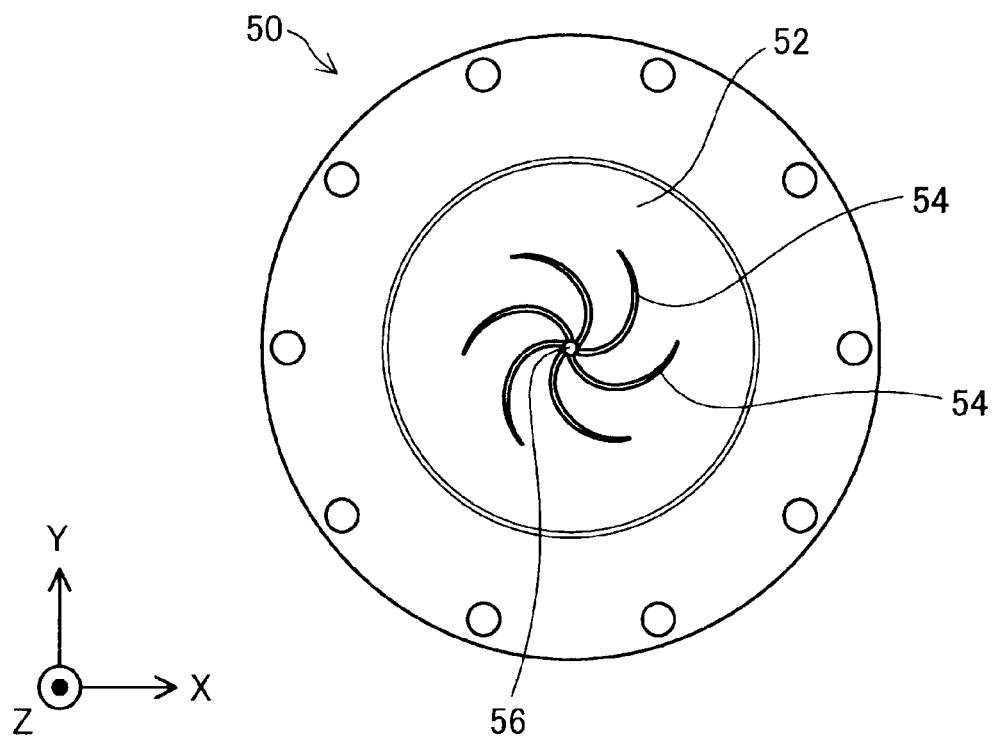
FIG. 3 is a schematic plan view illustrating a configuration of a screw facing portion.

FIG. 3 is a schematic plan view illustrating a side of the screw facing surface 52 of the screw facing portion 50. The screw facing surface 52 is located at the center of the screw facing portion 50 and has a circular shape having substantially the same diameter as the groove forming surface 48 of the flat screw 40. As described with reference to FIG. 1, the heater 58 is embedded in the screw facing surface 52 of the screw facing portion 50.

At the center of the screw facing surface 52, the above-described communication hole 56 for supplying the shaping material to the nozzle 61 is formed. In addition, on the screw facing surface 52, a plurality of guide grooves 54, which are coupled to the communication hole 56 and swirlingly extend from the communication hole 56 toward the outer periphery, are formed. The plurality of guide grooves 54 face the central portion 46 of the flat screw 40 and guide the shaping material flowed into the central portion 46 to the communication hole 56.

Referring now to FIGS. 1 and 2A, when the flat screw 40 rotates, the raw material MR supplied from the material supply path 33A to be described later through the material introduction portion 44 is guided by the scroll groove 42 while being heated in the scroll groove 42 and moves toward the central portion 46. The raw material MR is plasticized and melted as approaching the central portion 46, and the fluidity is enhanced to convert the raw material MR into a shaping material. The shaping material collected in the central portion 46 is guided to the flow path 65 of the nozzle 61 through the communication hole 56 by the internal pressure generated in the central portion 46, and is ejected from the ejecting port 62.

According to the generation unit 30 using the flat screw 40, the pressure in the scroll groove 42 increases as approaching the central portion 46 during plasticizing of the raw material MR, so that the degree of kneading of the finally generated shaping material is increased. The fact that "the degree of kneading is increased" means that the material is kneaded so as to be in a more uniform state. In addition, since the air present in the gaps of the raw material MR is pushed out toward a side of the material introduction portion 44 by the pressure generated in the scroll groove 42, the degassing of the shaping material is promoted.

Referring now to FIG. 1, in the material plasticizing device 10A, by adopting the flat screw 40 having a small size in the Z direction, the range occupied by the path for melting the raw material MR and guiding the raw material MR to the nozzle 61 in the Z direction reduces. As described above, in the material plasticizing device 10A, the generation unit 30 is miniaturized by using the flat screw 40.

In the shaping apparatus 100, by utilizing the flat screw 40 in the material plasticizing device 10A, a configuration for generating a shaping material having fluidity and pumping the shaping material to the nozzle 61 is easily realized. According to this configuration, control of the ejecting amount of the shaping material from the nozzle 61 is possible by control of the rotation speed of the flat screw 40, and control of the ejecting amount of the shaping material from the nozzle 61 is facilitated.

The shaping material used in the shaping apparatus 100 will be described. In the shaping apparatus 100, for example, a shaping object can be shaped with various materials such as a material having thermoplasticity, a metal material, and a ceramic material as main materials. Here, the "main material" means a material that is the center of the shaping material generated in the material plasticizing device 10A, and means a material that occupies 50% by weight or more of the shaping material. The above-described shaping materials include those obtained by melting the main material singly, and those obtained by melting some of the components contained together with the main material into a paste.

When using a material having thermoplasticity as the main material, in the generation unit 30, the shaping material is generated by plasticizing the main material. As a material having the thermoplasticity, the following thermoplastic resin material can be used, for example.

Examples of Thermoplastic Resin Material

General purpose engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), polyether ether ketone (PEEK), polycarbonate (PC), modified polyphenylene ether, polybutylene terephthalate, polyethylene terephthalate, and engineering plastics such as polysulfone, polyethersulfone, polyphenylene sulfide, polyarylate, polyimide, polyamide imide, polyether imide, polyether ether ketone.

The material having the thermoplasticity may be mixed with pigments, metals, ceramics, and other additives such as waxes, flame retardants, antioxidants, heat stabilizers, and the like. The material having the thermoplasticity is converted into a molten state by being plasticized by the rotation of the flat screw 40 and the heating of the heater 58 in the generation unit 30. The shaping material generated by melting the material having the thermoplasticity is ejected from the nozzle 61 and thereafter hardened due to the temperature decrease.

It is desirable that the material having the thermoplasticity is ejected from the nozzle 61 in a completely melted state by being heated to the glass transition point or more. For example, it is desirable that the ABS resin has a glass transition point of approximately 120° C., and approximately 200° C. when ejected from the nozzle 61. A heater may be provided around the nozzle 61 to eject the shaping material in such a high temperature state.

In the shaping apparatus 100, for example, the following metal material may be used as a main material instead of the material having the thermoplasticity described above. In this case, it is desirable that a component to be plasticized and melted at the time of generation of the shaping material is mixed with a powder material obtained by powdering the following metal material and supplied to the generation unit 30 as the raw material MR.

Examples of Metal Material

A single metal of magnesium (Mg), iron (Fe), cobalt (Co), chromium (Cr), aluminum (Al), titanium (Ti), copper (Cu), nickel (Ni), or alloy containing one or more of these metals.

Examples of Alloy

Maraging steel, stainless steel, cobalt chromium molybdenum steel, titanium alloy, nickel alloy, aluminum alloy, cobalt alloy, cobalt chromium alloy.

In the shaping apparatus 100, it is possible to use a ceramic material as a main material instead of the above metal materials. As the ceramic material, for example, oxide ceramics such as silicon dioxide, titanium dioxide, aluminum oxide and zirconium oxide, or non-oxide ceramics such as aluminum nitride can be used. When the metal material or the ceramic material as described above is used as the main material, the shaping material disposed on the table 210 may be hardened by sintering.

The powder material of the metal material or the ceramic material to be supplied to the material supply source 21 as the raw material MR may be a mixture of a plurality of types of single metal powder, alloy powder or ceramic material powder. In addition, the powder material of the metal material or the ceramic material may be coated with, for example, the thermoplastic resin as exemplified above, or a thermoplastic resin other than these. In this case, in the generation unit 30, the thermoplastic resin may be melted to exhibit fluidity.

For example, a solvent as described below can be added to the powder material of the metal material or the ceramic material input to the material supply source 21 as the raw material MR. The solvent can be used solely or in combination of two or more selected from the following. Examples of Solvent Water, (poly) alkylene glycol monoalkyl ethers such as ethylene glycol monomethyl ether, ethylene glycol monoethyl ether, propylene glycol monomethyl ether, propylene glycol monoethyl ether, acetate esters such as ethyl acetate, n-propyl acetate, iso-propyl acetate, n-butyl acetate, iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, acetylacetone, alcohols such as ethanol, propanol, butanol, tetraalkyl ammonium acetates, sulfoxide solvents such as dimethylsulfoxide and diethylsulfoxide, pyridine solvents such as pyridine, γ-picoline, 2,6-lutidine, and ionic liquids such as tetraalkyl ammonium acetate (for example, tetrabutylammonium acetate and the like), butyl carbitol acetate.

In addition, for example, the following binders may be added to the powder material of the metal material or the ceramic material to be supplied to the material supply source 21 as the raw material MR.

Examples of Binder

Acrylic resin, epoxy resin, silicone resin, cellulose resin, other synthetic resin, polylactic acid (PLA), polyamide (PA), polyphenylene sulfide (PPS), polyether ether ketone (PEEK), or other thermoplastic resin.

Figure 4:
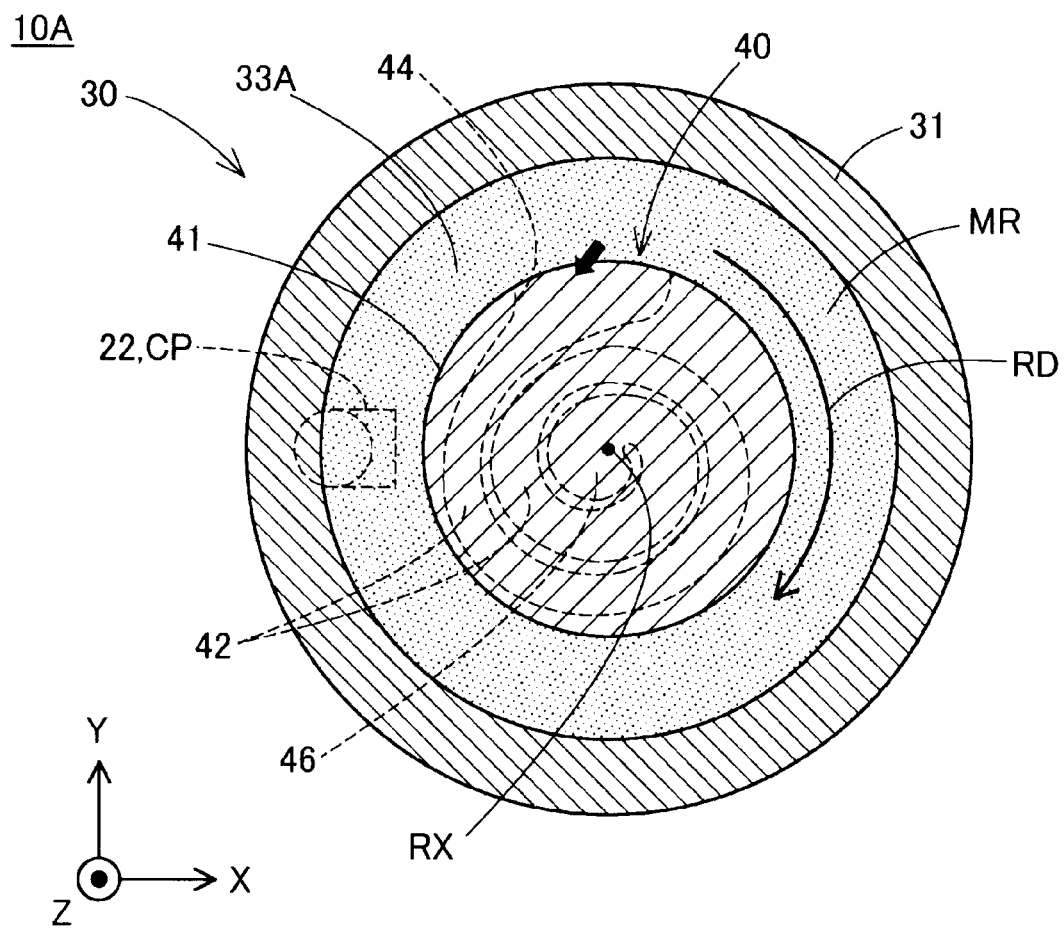
FIG. 4 is a schematic view illustrating a configuration of a supply flow path according to the first embodiment.

The configuration of the material supply path 33A for supplying the raw material MR to the material introduction portion 44 of the flat screw 40 will be described with reference to FIGS. 1 and 4. FIG. 4 illustrates a schematic cross section of the material plasticizing device 10A in the IV-IV cutting illustrated in FIG. 1. In FIG. 4, for convenience, a coupling position CP between the coupling pipeline 22 of the supply unit 20 and the material supply path 33A is illustrated by a broken line.

As illustrated in FIG. 4, the material supply path 33A is provided in a region on the radially outer side of the flat screw 40 in the screw case 31, that is, in the outer peripheral region surrounding the outer periphery of the groove forming surface 48. As illustrated in FIG. 1, the material supply path 33A faces the outer peripheral side surface 41 of the flat screw 40 and is formed along the outer peripheral side surface 41 of the flat screw 40. The outer peripheral side surface 41 of the flat screw 40 constitutes an inner wall surface on the inner peripheral side of the material supply path 33A. The material supply path 33A is configured as a tubular path surrounded by the inner wall surface constituted by an upper wall surface 36, a side wall surface 35, a bottom surface 34, and the outer peripheral side surface 41 of the flat screw 40.

In the first embodiment, the material supply path 33A extends over the entire circumferential direction of the flat screw 40 so as to surround the outer periphery of the flat screw 40 when viewed in the axial direction of the flat screw 40. In addition, the width, depth, and cross-sectional area of the material supply path 33A are substantially constant.

Here, "width of the material supply path 33A" is a maximum value of the distance between the inner wall surfaces of the material supply paths 33A facing each other in the radial direction of the flat screw 40. The "depth of the material supply path 33A" is a maximum value of the distance between the inner wall surfaces of the material supply path 33A facing each other in the axial direction of the flat screw 40. The "cross-sectional area of the material supply path 33A" is an opening area of the material supply path 33A in a cross section perpendicular to the central axis of the material supply path 33A. The cross-sectional area of the material supply path 33A may be restated as the opening area of the material supply path 33A at a cross section perpendicular to the direction along the material supply path 33A or a cross section perpendicular to the rotation direction of the flat screw 40.

Referring now to FIG. 1, the raw material MR of the material supply source 21 is supplied to the material supply path 33A through the coupling pipeline 22, as described above. Referring now to FIG. 4, the raw material MR supplied to the material supply path 33A is induced in the rotation direction RD of the flat screw 40 from the coupling position CP of the coupling pipeline 22 by the rotation of the flat screw 40. While the flat screw 40 is rotating, the raw material MR is introduced into the scroll groove 42 through the material introduction portion 44 of the outer peripheral side surface 41 of the flat screw 40 while moving in the rotation direction RD in the material supply path 33A.

According to the material plasticizing device 10A of the first embodiment, the material supply path 33A extends along the outer periphery of the flat screw 40. Therefore, as compared with a configuration in which the raw material MR flows into the material introduction portion 44 only at the coupling position CP of the coupling pipeline 22, the period in which the raw material MR can continuously flow into the scroll groove 42 through the material introduction portion 44 is increased by the length of the material supply path 33A. Therefore, the amount of the raw material MR supplied into the scroll groove 42 through the material introduction portion 44 is prevented from varying in accordance with a rotation angle of the flat screw 40, and the pressure in the scroll groove 42 is prevented from varying. Therefore, the amount of the shaping material flowing out from the communication hole 56, that is, the supply amount of the shaping material to the ejecting portion 60, is prevented from varying by the rotation angle of the flat screw 40.

In addition, in the material plasticizing device 10A of the first embodiment, as described above, the material supply path 33A extends so as to surround the entire outer periphery of the flat screw 40. Therefore, while the flat screw 40 is rotating, the raw material MR can be normally allowed to flow from the material introduction portion 44 into the scroll groove 42 regardless of the rotation angle of the flat screw 40. Therefore, it is further suppressed that the supply of the raw material MR to the scroll groove 42 is interrupted midway, and the amount of the shaping material flowing out from the communication hole 56 is varied.

As described above, when the material supply path 33A extends along the outer periphery of the flat screw 40, intermittent supply of the raw material MR into the scroll groove 42 through the material introduction portion 44 is suppressed. Therefore, while the inflow of the raw material MR to the material introduction portion 44 is interrupted, a portion of the raw material MR melts in the vicinity of the material introduction portion 44 and occurrence of a situation where the material introduction portion 44 is clogged is suppressed.

In addition, since the material supply path 33A is formed over the entire outer periphery of the flat screw 40, the material introduction portion 44 is not blocked by the wall surface of the screw case 31 while the flat screw 40 is rotating. Therefore, rotation of the flat screw 40 prevents the raw material MR from being caught between the material introduction portion 44 and the wall surface of the screw case 31 and being crushed. Therefore, the raw material MR in a state of being finely crushed and easily melted is prevented from flowing into the scroll groove 42, and thus it is suppressed that such raw material MR is melted in the middle of the scroll groove 42 and adheres to the wall surface to form a wall, and the scroll groove 42 is blocked.

The material supply path 33A is provided only in the outer peripheral region of the flat screw 40, and is provided at a position not overlapping the heater 58 when viewed in the direction from the flat screw 40 toward the screw facing portion 50. As a result, the raw material MR before being introduced into the material introduction portion 44 of the flat screw 40 can be kept away from the heater 58, and the raw material MR is prevented from receiving heat from the heater 58. Therefore, the occurrence of supply failure of the raw material MR due to melting in the middle of the supply path until the raw material MR reaches the central portion 46 of the flat screw 40 is suppressed.

Referring back to FIG. 1, in the first embodiment, the bottom surface 34 of the material supply path 33A is inclined to face the outer peripheral side surface 41 of the flat screw 40. That is, the bottom surface 34 is inclined to be positioned downward in the gravity direction as approaching the outer peripheral side surface 41 of the flat screw 40. As a result, the raw material MR is likely to be guided toward the material introduction portion 44 by gravity in the material supply path 33A. Therefore, the supply of the raw material MR into the scroll groove 42 is stabilized, and the variation of the pressure in the scroll groove 42 is further suppressed. An inclination angle of the bottom surface 34 with respect to the horizontal plane is preferably 30° or more.

As illustrated in FIG. 1, in the first embodiment, the side wall surface 35 on the outer peripheral side of the material supply path 33A is inclined to be positioned downward so as to approach the outer peripheral side surface 41 of the flat screw 40. As a result, the raw material MR is likely to be guided to the material introduction portion 44, and the variation in the supply of the raw material MR into the scroll groove 42 can be further suppressed.

As described above, according to the material plasticizing device 10A of the first embodiment, the material supply path 33A suppresses the variation in the supply amount of the raw material MR into the scroll groove 42 of the flat screw 40. Therefore, variation of the pressure in the scroll groove 42 according to the rotation angle of the flat screw 40 is suppressed, and variation of the flow rate of the shaping material flowing out from the communication hole 56 is suppressed. In addition, accordingly, since supply of the shaping material to the ejecting portion 60 is stabilized, shaping accuracy of the shaping object in the shaping apparatus 100 is raised. In addition, according to the material plasticizing device 10A of the first embodiment, various effects described in the first embodiment can be achieved.

2. Second Embodiment

Figure 5:
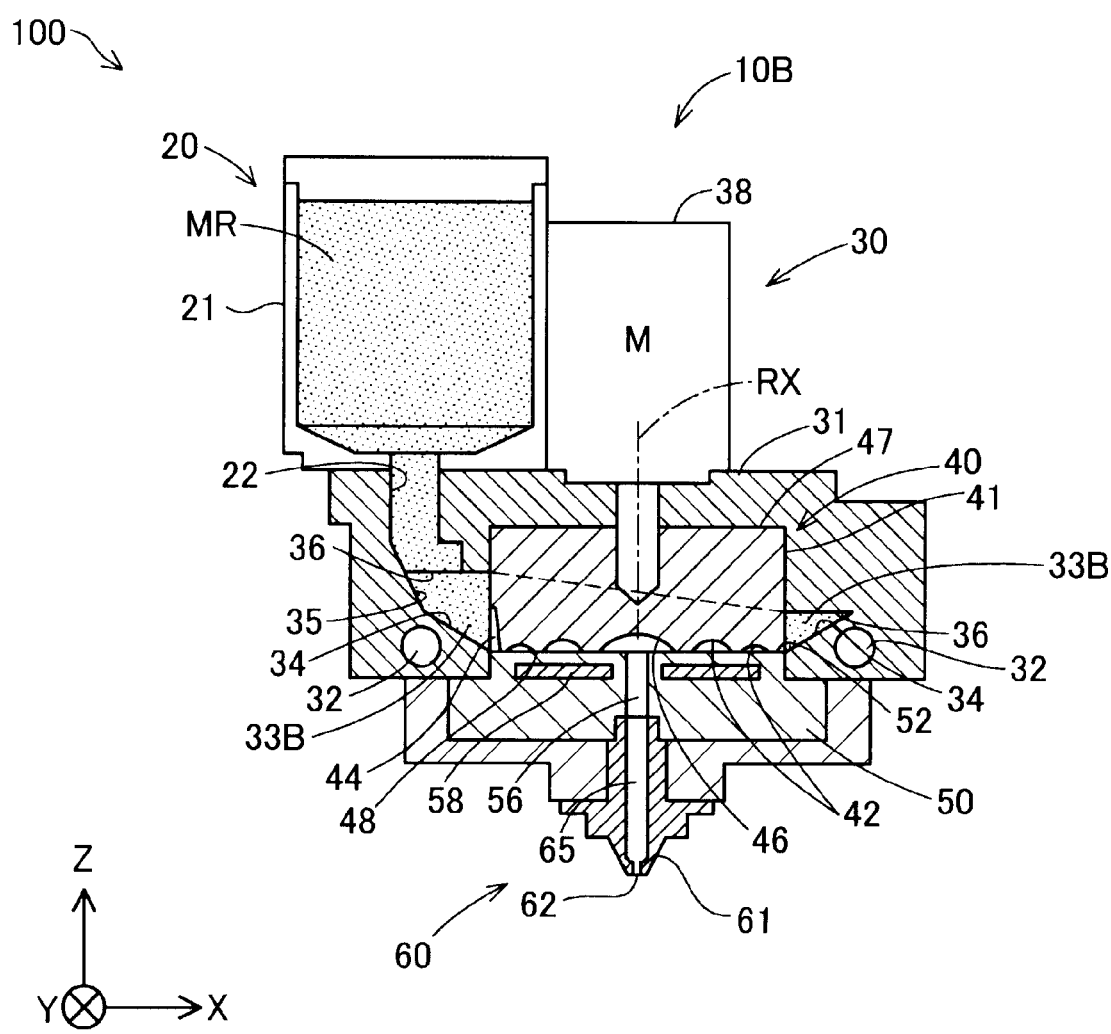
FIG. 5 is a schematic view illustrating a configuration of a material plasticizing device according to a second embodiment.

FIG. 5 is a schematic view illustrating a configuration of a material plasticizing device 10B according to a second embodiment. The configuration of the material plasticizing device 10B of the second embodiment is substantially the same as the material plasticizing device 10A of the first embodiment except that a material supply path 33B of the second embodiment is provided instead of the material supply path 33A described in the first embodiment. The material plasticizing device 10B of the second embodiment is mounted on the shaping apparatus 100 similar to the apparatus described in the first embodiment, and supplies the shaping material obtained by plasticizing and melting the raw material MR to the ejecting portion 60. In FIG. 5, for convenience, the control unit 101, the table 210, and the movement mechanism 230 of the three-dimensional shaping apparatus 100 are omitted.

Figure 6:
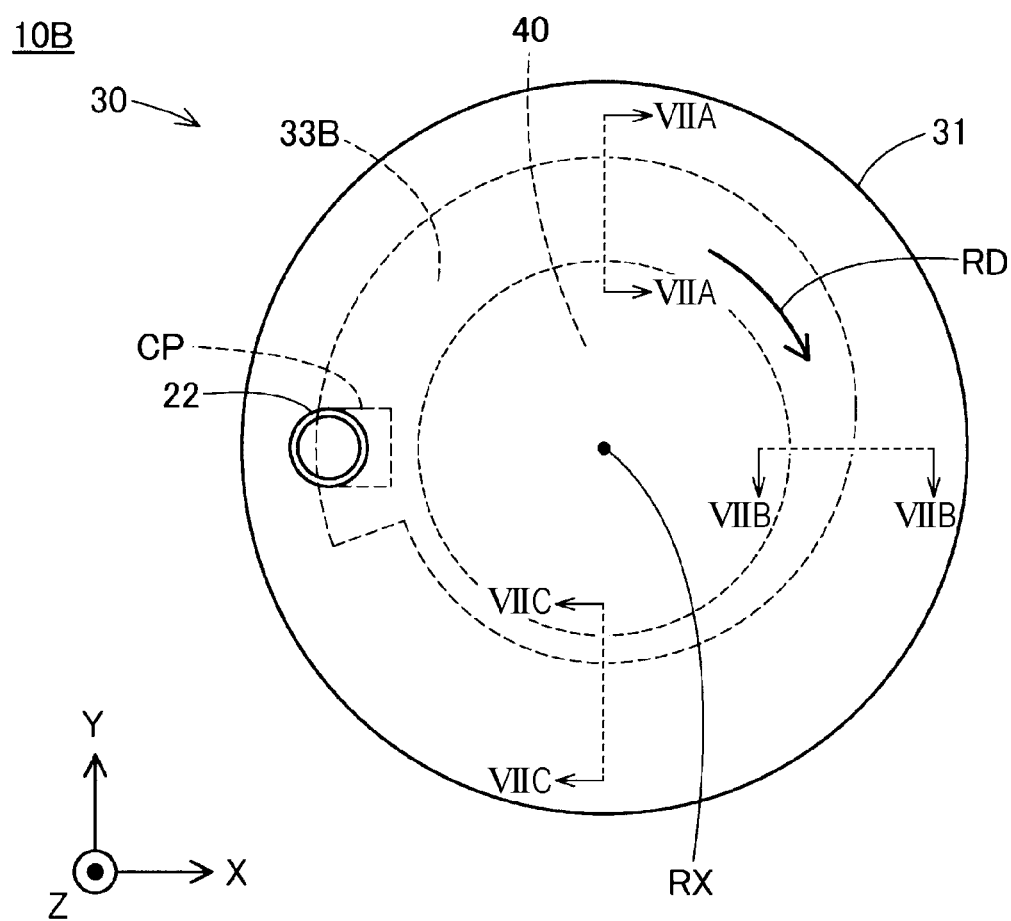
FIG. 6 is a schematic view illustrating a formation region of a supply flow path according to the second embodiment.
Figure 7A:
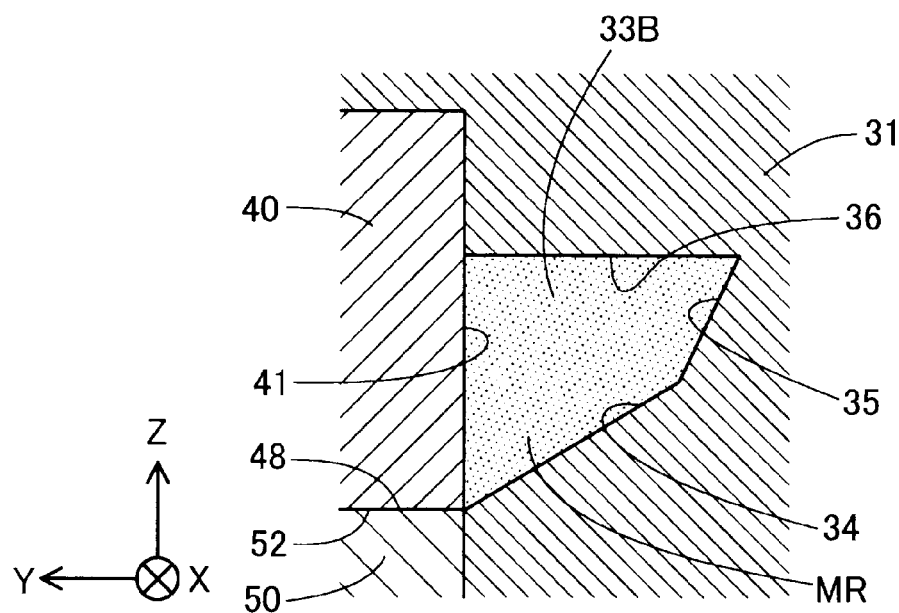
FIG. 7A is a first schematic sectional view of a supply flow path according to the second embodiment.
Figure 7B:
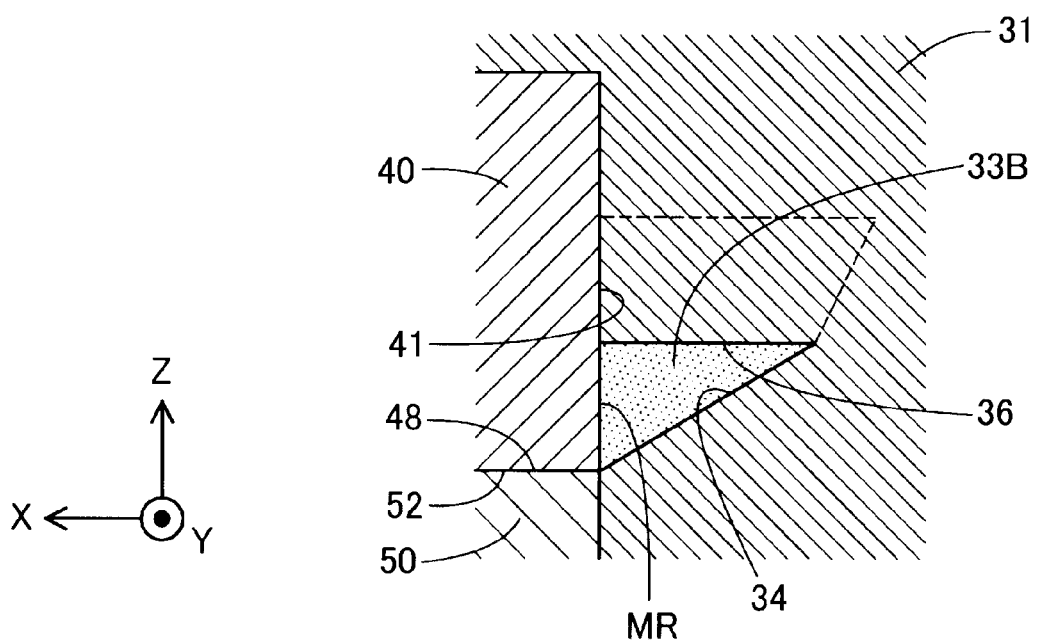
FIG. 7B is a second schematic sectional view of the supply flow path according to the second embodiment.
Figure 7C:
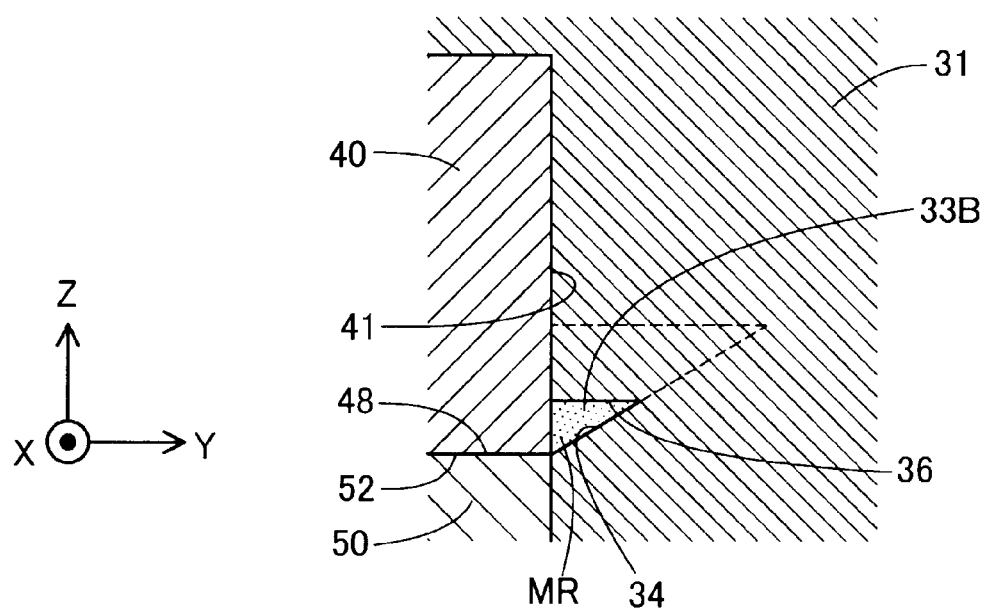
FIG. 7C is a third schematic sectional view of the supply flow path according to the second embodiment.

The configuration of the material supply path 33B of the second embodiment will be described with reference to FIGS. 5, 6, and 7A to 7C. FIG. 6 is a schematic top view of the generation unit 30 as viewed from above along the axial direction of the flat screw 40. In FIG. 6, a disposing region of the flat screw 40 and a formation region of the material supply path 33B in the screw case 31 are illustrated by broken lines. In FIG. 6, for convenience, illustration of the material supply source 21 of the supply unit 20 is omitted. FIGS. 7A, 7B, and 7C are schematic sectional views of the material supply path 33B in a VIIA-VIIA cutting, a VIIB-VIIB cutting, and a VIIC-VIIC cutting illustrated in FIG. 6, respectively.

The material supply path 33B of the second embodiment is substantially the same as the configuration of the material supply path 33A of the first embodiment except for the points described below. As illustrated in FIGS. 7A to 7C, the material supply path 33B is configured such that the position of the upper wall surface 36 decreases in the gravity direction and the depth thereof decreases as separating from the coupling position CP with the coupling pipeline 22 in the rotation direction RD of the flat screw 40. The bottom surface 34 and the side wall surface 35 of the material supply path 33B are inclined as described in the first embodiment. Therefore, as the position of the upper wall surface 36 is lowered, as illustrated in FIG. 6, the width of the material supply path 33B decreases as separating from the coupling position CP with the coupling pipeline 22 in the rotation direction RD of the flat screw 40. In addition, the cross-sectional area of the material supply path 33B also decreases as separating from the coupling position CP with the coupling pipeline 22 in the rotation direction RD of the flat screw 40.

As described above, in the material supply path 33B, the width thereof gradually decreases from the coupling position CP toward the rotation direction RD. Therefore, the distance between the inner wall surface of the screw case 31 and the material introduction portion 44 decreases as the position separates from the coupling position CP, and the raw material MR is likely to be guided to the material introduction portion 44. Therefore, the raw material MR is prevented from staying in a region separated from the coupling pipeline 22 in the material supply path 33B, and the deterioration of the raw material MR and the occurrence of the supply failure of the raw material MR due to such staying are suppressed.

In addition, in the material supply path 33B, the cross-sectional area thereof is gradually reduced from the coupling position CP toward the rotation direction RD, and a space configured to store the raw material MR is reduced as the position separates from the coupling position CP. Therefore, the raw material MR can be further prevented from staying in the region separated from the coupling pipeline 22 in the material supply path 33B.

As described above, according to the material plasticizing device 10B of the second embodiment, by the material supply path 33B whose width and cross-sectional area are reduced in the rotation direction RD, the raw material MR is prevented from staying in the material supply path 33B. In addition, according to the material plasticizing device 10B of the second embodiment and the shaping apparatus 100 provided with the material plasticizing device 10B, various effects described in the second embodiment and the first embodiment can be achieved.

3. Third Embodiment

Figure 8:
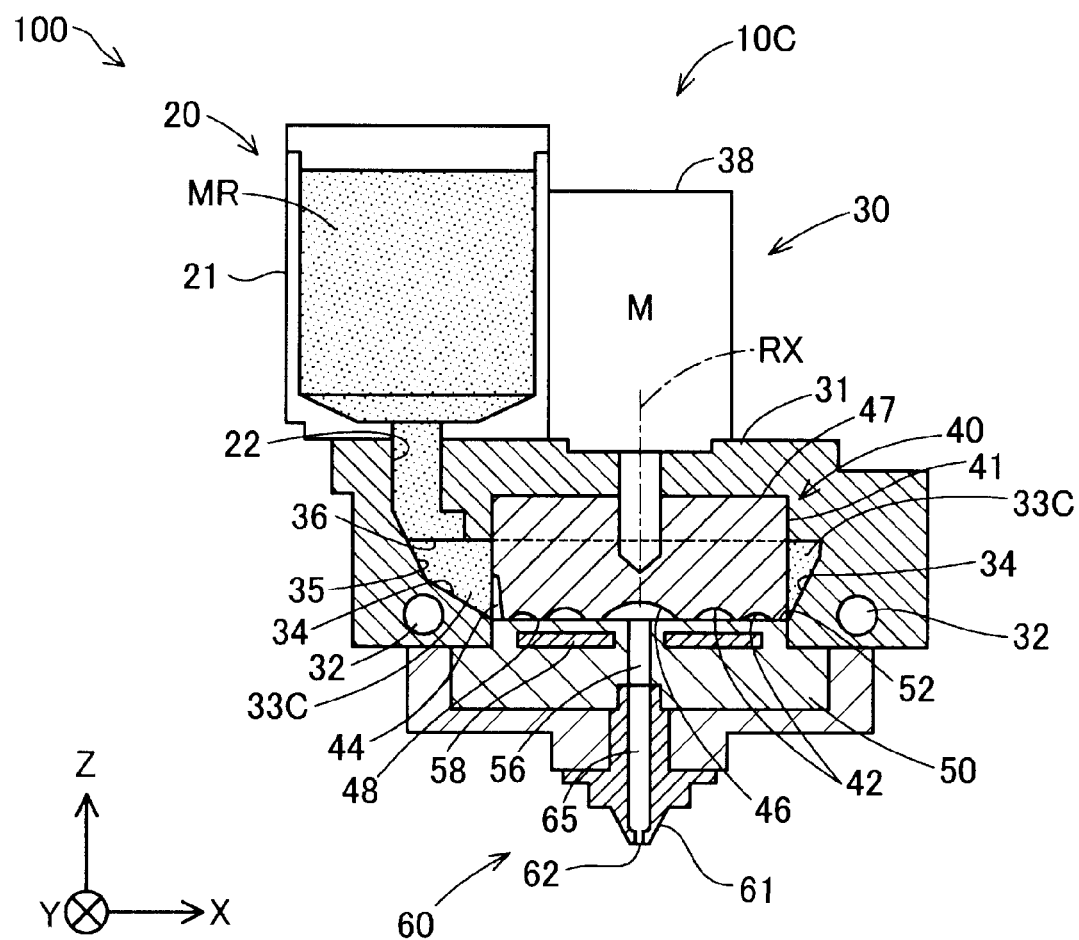
FIG. 8 is a schematic view illustrating a configuration of a material plasticizing device according to a third embodiment.

FIG. 8 is a schematic view illustrating a configuration of a material plasticizing device 10C according to a third embodiment. The configuration of the material plasticizing device 10C of the third embodiment is substantially the same as the configuration of the material plasticizing device 10A of the first embodiment except that the material supply path 33C of the third embodiment is provided instead of the material supply path 33A described in the first embodiment. The material plasticizing device 10C of the third embodiment is mounted on the shaping apparatus 100 similar to the apparatus described in the first embodiment, and supplies the shaping material obtained by plasticizing and melting the raw material MR to the ejecting portion 60. In FIG. 8, for convenience, the control unit 101, the table 210, and the movement mechanism 230 of the three-dimensional shaping apparatus 100 are omitted.

Figure 9:
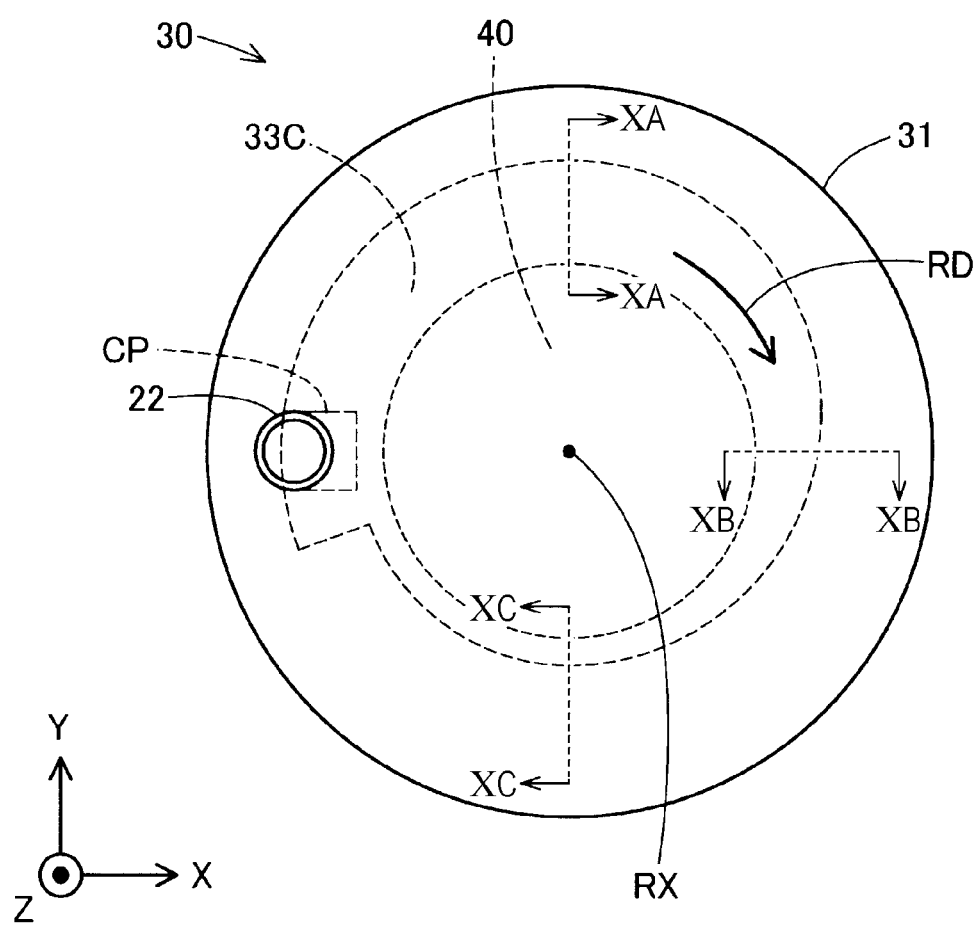
FIG. 9 is a schematic cross-sectional view illustrating a formation region of a material supply flow path according to the third embodiment.
Figure 10A:
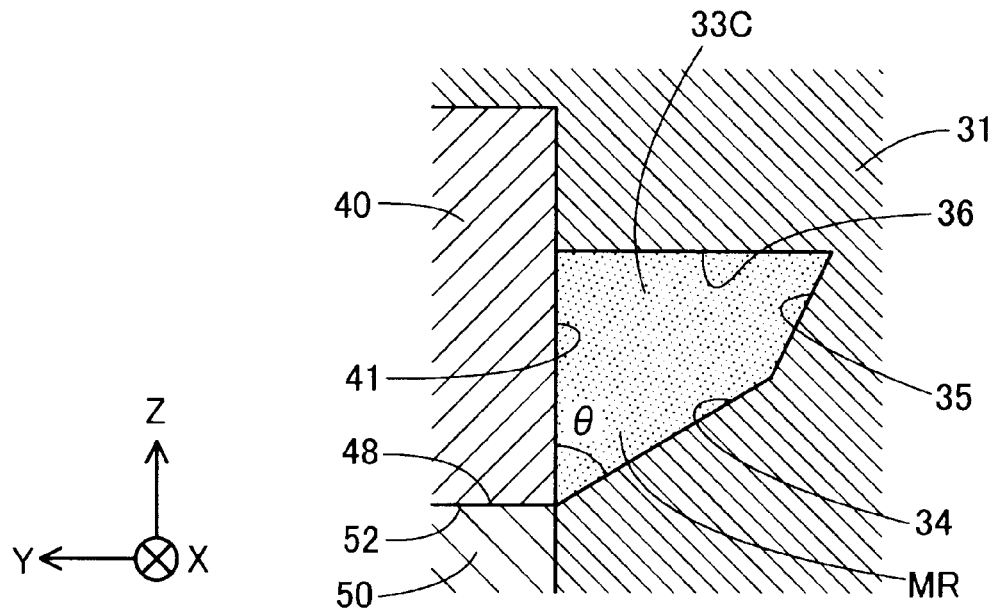
FIG. 10A is a first schematic sectional view of a supply flow path according to the third embodiment.
Figure 10B:
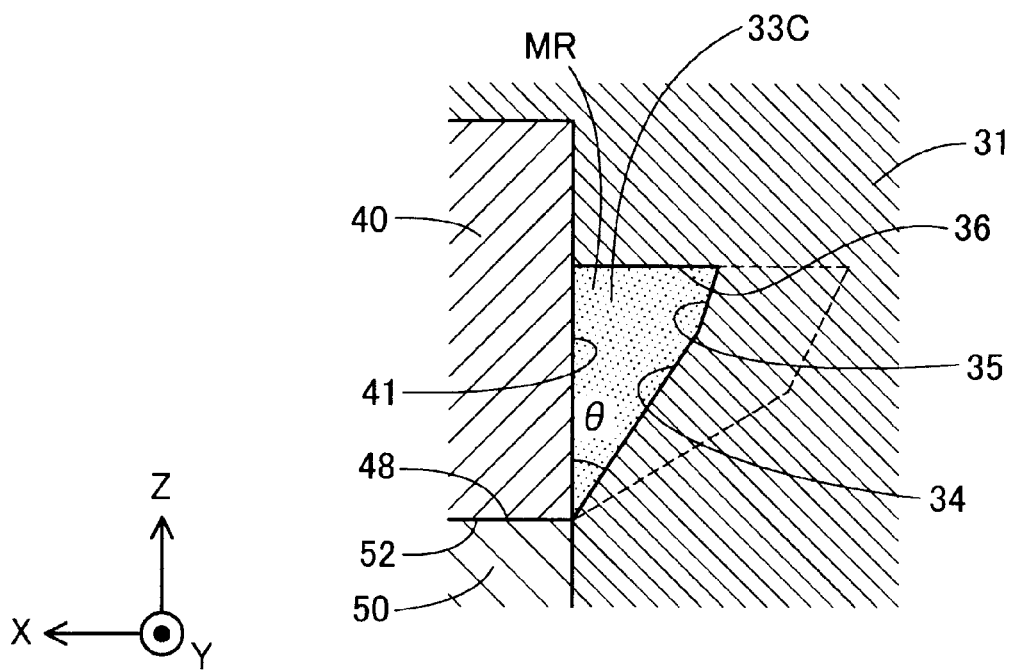
FIG. 10B is a second schematic sectional view of the supply flow path according to the third embodiment.
Figure 10C:
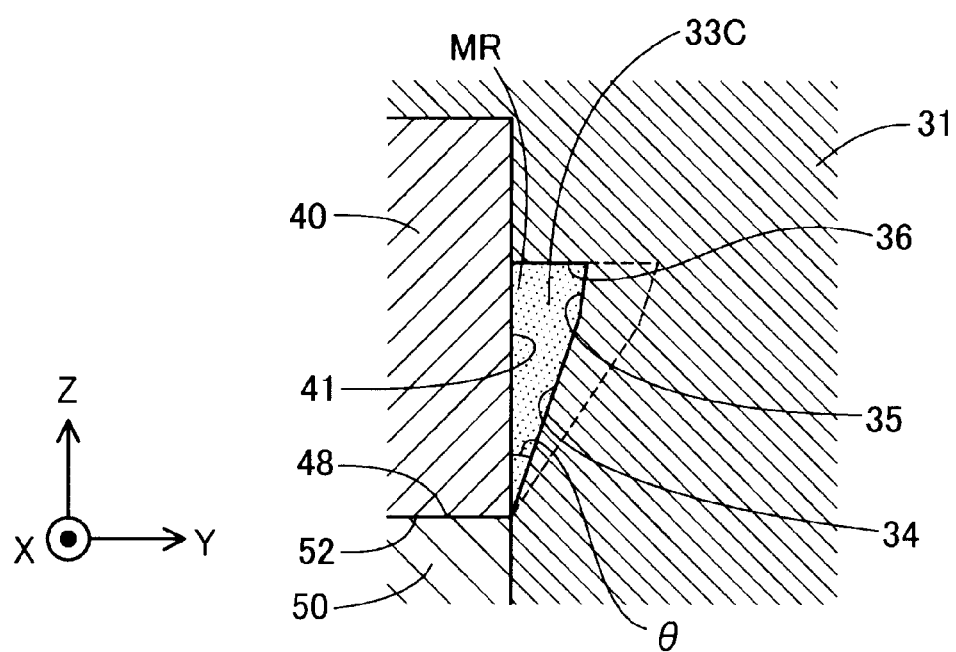
FIG. 10C is a third schematic sectional view of the supply flow path according to the third embodiment.

The configuration of the material supply path 33C of the third embodiment will be described with reference to FIGS. 8, 9 and 10A to 10C. FIG. 9 is a schematic top view of the generation unit 30 as viewed from above along the axial direction of the flat screw 40. As illustrated in FIG. 9, a disposing region of the flat screw 40 and a formation region of the material supply path 33C in the screw case 31 are illustrated by broken lines. In FIG. 9, for convenience, the illustration of the material supply source 21 of the supply unit 20 is omitted. FIGS. 10A, 10B, and 10C are schematic sectional views of the material supply path 33C in a XA-XA cutting, a XB-XB cutting, and a XC-XC cutting illustrated in FIG. 9, respectively.

The material supply path 33C of the third embodiment is substantially the same as the configuration of the material supply path 33A of the first embodiment except for the points described below. In the material supply path 33C, as illustrated in FIGS. 10A to 10C, an angle θ interposed by the bottom surface 34 and the outer peripheral side surface 41 of the flat screw 40 decreases as separating from the coupling position CP with the coupling pipeline 22 in the rotation direction RD of the flat screw 40. That is, the inclination angle of the bottom surface 34 with respect to the horizontal plane is steeper as separating from the coupling position CP with the coupling pipeline 22 in the rotation direction RD of the flat screw 40. As a result, as illustrated in FIG. 9, the width of the material supply path 33C decreases as separating from the coupling position CP with the coupling pipeline 22 in the rotation direction RD of the flat screw 40. As illustrated in FIGS. 10A to 10C, the cross-sectional area of the material supply path 33C decreases as separating from the coupling position CP with the coupling pipeline 22 in the rotation direction RD of the flat screw 40.

As described above, in the material supply path 33C, the inclination angle of the bottom surface 34 gradually becomes steeper from the coupling position CP toward the rotation direction RD. Therefore, the raw material MR is likely to be guided to the material introduction portion 44 by gravity as the position separates from the coupling position CP. Therefore, the raw material MR is prevented from staying in the region separated from the coupling pipeline 22 in the material supply path 33B, and the deterioration of the raw material MR and the occurrence of the supply failure of the raw material MR due to such staying are suppressed.

In addition, in the material supply path 33C, the width thereof gradually decreases from the coupling position CP toward the rotation direction RD. Therefore, the distance between the outer peripheral side surface 41 of the flat screw 40 and the inner wall surface of the screw case 31 opposed thereto is reduced as the position separates from the coupling position CP, and the raw material MR is guided to the material introduction portion 44. Therefore, the raw material MR is prevented from staying in the region separated from the coupling pipeline 22 in the material supply path 33B.

In addition, in the material supply path 33C, the cross-sectional area thereof gradually decreases from the coupling position CP toward the rotation direction RD. As a result, the space configured to store the raw material MR is reduced as the position separates from the coupling position CP, so that the raw material MR is effectively prevented from staying in the region separated from the coupling pipeline 22 in the material supply path 33B.

As described above, according to the material plasticizing device 10B of the third embodiment, by the material supply path 33B having the bottom surface 34 whose inclination angle becomes steep in the rotation direction RD, the raw material MR is prevented from staying in the material supply path 33B. In addition, according to the material plasticizing device 10C of the third embodiment and the shaping apparatus 100 provided with the material plasticizing device 10C, various effects described in the third embodiment and the first embodiment can be achieved.

4. Fourth Embodiment

Figure 11:
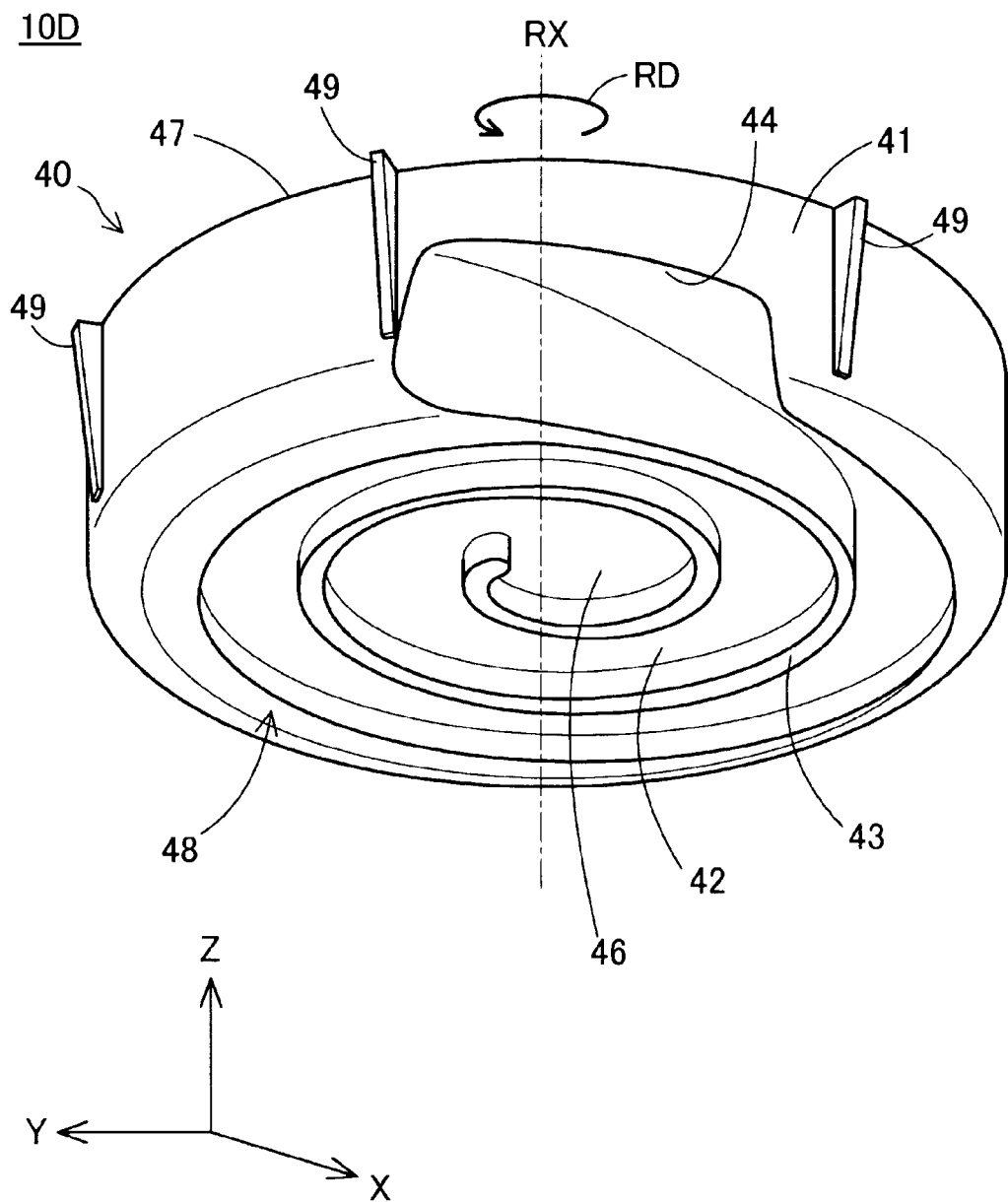
FIG. 11 is a schematic perspective view illustrating a configuration of a flat screw according to a fourth embodiment.
Figure 12:
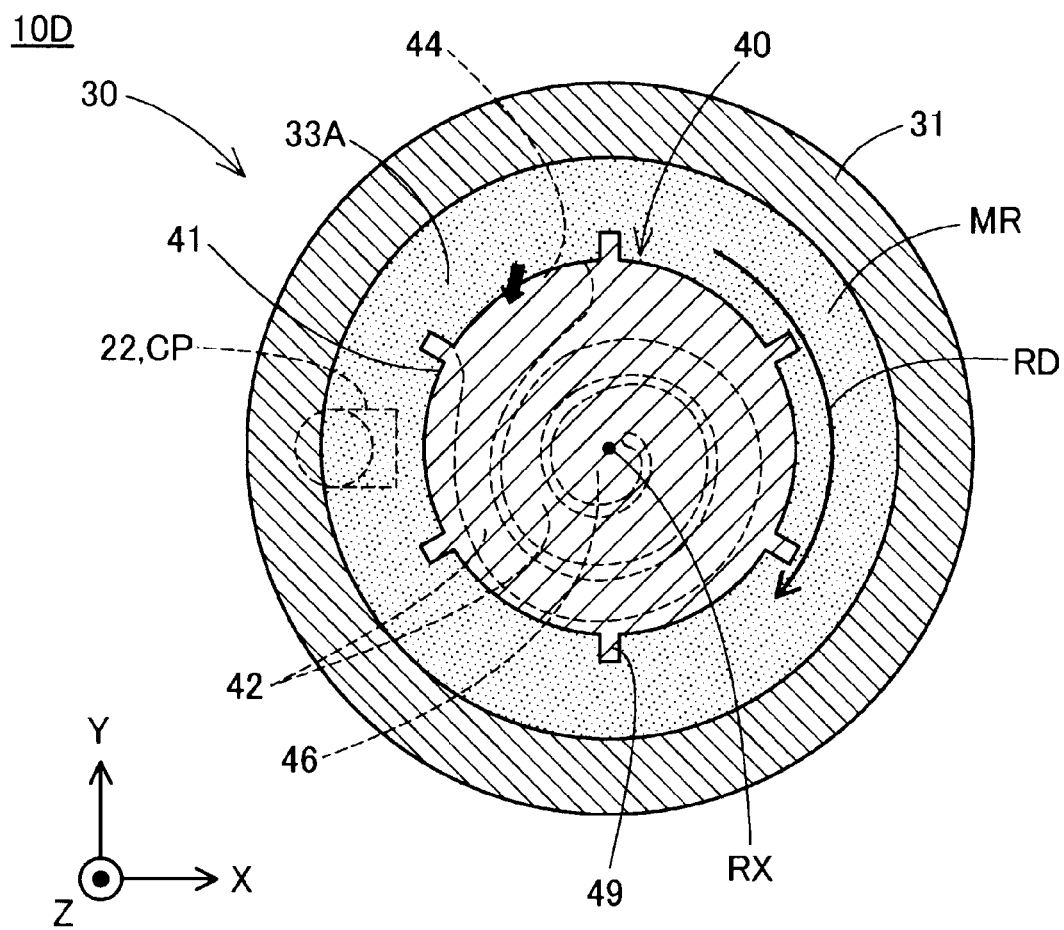
FIG. 12 is a schematic cross-sectional view illustrating a configuration in a screw case according to the fourth embodiment.

A configuration of a material plasticizing device 10D of a fourth embodiment will be described with reference to FIGS. 11 and 12. FIGS. 11 and 12 are substantially the same as FIGS. 2A and 4, respectively, except that a stirring portion 49 is added to the outer peripheral side surface 41 of the flat screw 40. The configuration of the material plasticizing device 10D of the fourth embodiment is substantially the same as the configuration of the material plasticizing device 10A of the first embodiment except that the stirring portion 49 is provided on the outer peripheral side surface 41 of the flat screw 40. The material plasticizing device 10D is mounted on the shaping apparatus 100 described in the first embodiment.

In the fourth embodiment, the stirring portion 49 is configured as a protruding portion that protrudes in the radial direction of the flat screw 40 from the outer peripheral side surface 41 of the flat screw 40. More specifically, the stirring portion 49 is disposed in the circumferential direction of the flat screw 40, and is formed as a plurality of ribs extending in the axial direction of the flat screw 40, that is, the plate-like protruding portions. In the examples of FIGS. 11 and 12, six plate-like protruding portions are disposed at substantially equal intervals in the circumferential direction of the flat screw 40.

In the material plasticizing device 10D, when the flat screw 40 rotates, the raw material MR in the material supply path 33A is stirred by the stirring portion 49. Therefore, clogging of the raw material MR in the material supply path 33A is suppressed, and the flow of the raw material MR in the material supply path 33A is facilitated. Therefore, the clogging of the raw material MR in the material introduction portion 44 and the staying of the raw material MR in the material supply path 33A are suppressed.

As illustrated in FIG. 11, it is desirable that the protruding portion constituting the stirring portion 49 is configured to further protrude in the radial direction from the groove forming surface 48 toward a side of the upper surface 47. As a result, it is possible to stir as much as the raw material MR located in a side of the upper wall surface 36 of material supply path 33A, and it is possible to suppress the staying of the raw material MR above the material introduction portion 44.

The number and disposing interval of the protruding portions constituting the stirring portion 49 are not particularly limited. In other embodiment, only one plate-like portion may be provided, the number of sheets less than six, or the number of sheets more than six may be disposed at different intervals or periodically changing intervals.

Stirring portions 49a, 49b, 49c, 49d and 49e as another configuration example will be described with reference to FIGS. 13A to 13E. FIGS. 13A to 13E are schematic views planarly illustrating plate-like protruding portions which constitute the stirring portions 49a, 49b, 49c, 49d, and 49e, respectively, when the flat screw 40 is viewed in the radial direction.

Figure 13A:
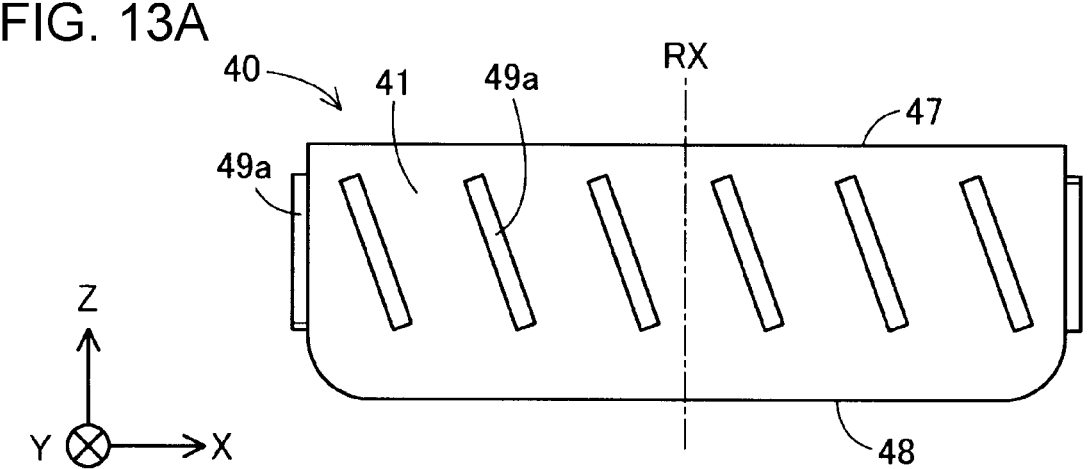
FIG. 13A is a schematic view illustrating a variation of a configuration of a stirring portion.
Figure 13B:
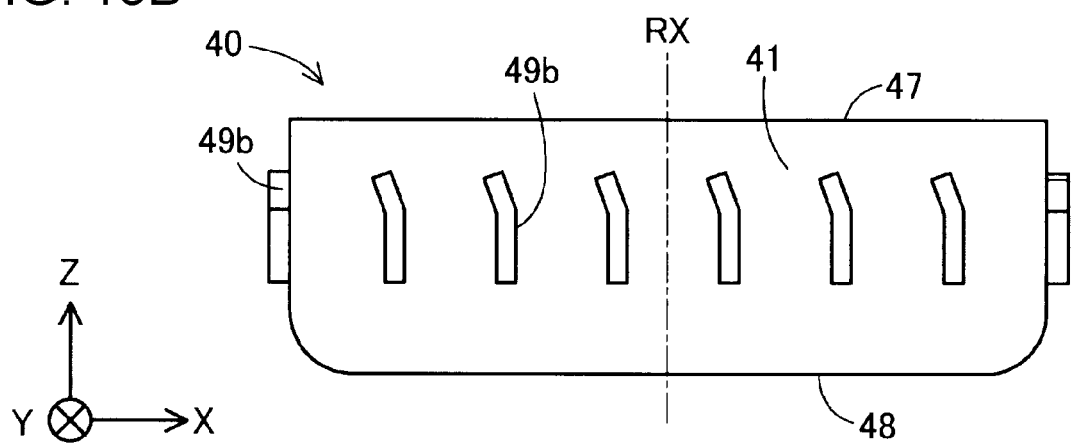
FIG. 13B is a schematic view illustrating a variation of a configuration of the stirring portion.
Figure 13C:
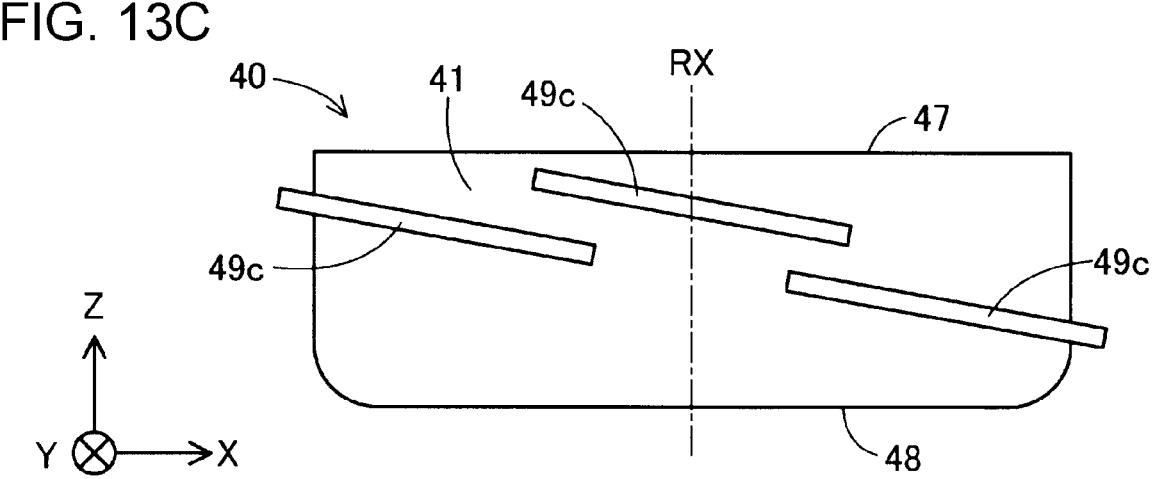
FIG. 13C is a schematic view illustrating a variation of a configuration of the stirring portion.
Figure 13D:
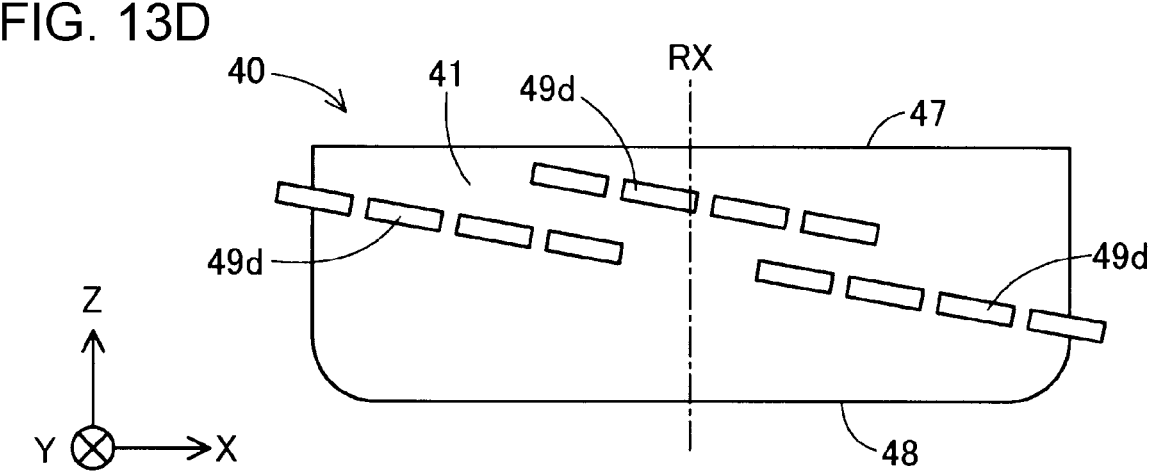
FIG. 13D is a schematic view illustrating a variation of a configuration of the stirring portion.
Figure 13E:
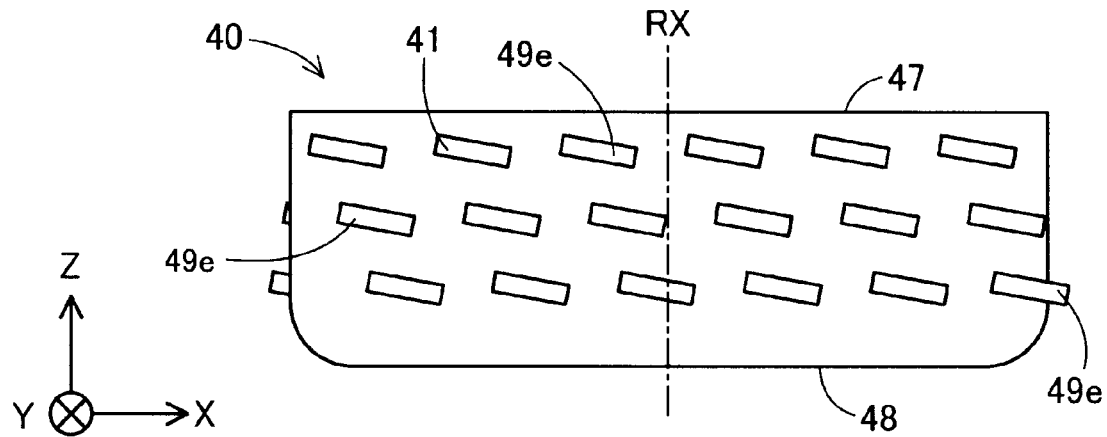
FIG. 13E is a schematic view illustrating a variation of a configuration of the stirring portion.

The stirring portion 49a illustrated in FIG. 13A is configured to include a plate-like protruding portion extending obliquely with respect to the axial direction of the flat screw 40. In this manner, it is possible to reduce the resistance received from the raw material MR present in the material supply path 33A when the flat screw 40 rotates. The stirring portion 49b illustrated in FIG. 13B has a bending portion, and is configured to include a plate-like protruding portion bent in the middle. The stirring portion 49c illustrated in FIG. 13C is configured to include a plate-like protruding portion extending obliquely along the circumferential direction of the flat screw 40 at an angle closer to the radial direction than the axial direction. As a result, the resistance received from the raw material MR present in the material supply path 33A can be further reduced. The stirring portion 49d illustrated to FIG. 13D is obliquely extended along the circumferential direction of the flat screw 40, and is configured to include a plate-like protruding portion in which cuts are provided in the middle. The stirring portion 49e illustrated in FIG. 13E is configured to include a plurality of short plate-like protruding portions which are arranged in the axial direction and circumferential direction of the flat screw 40 and obliquely extend along the circumferential direction of the flat screw 40.

Figure 14A:
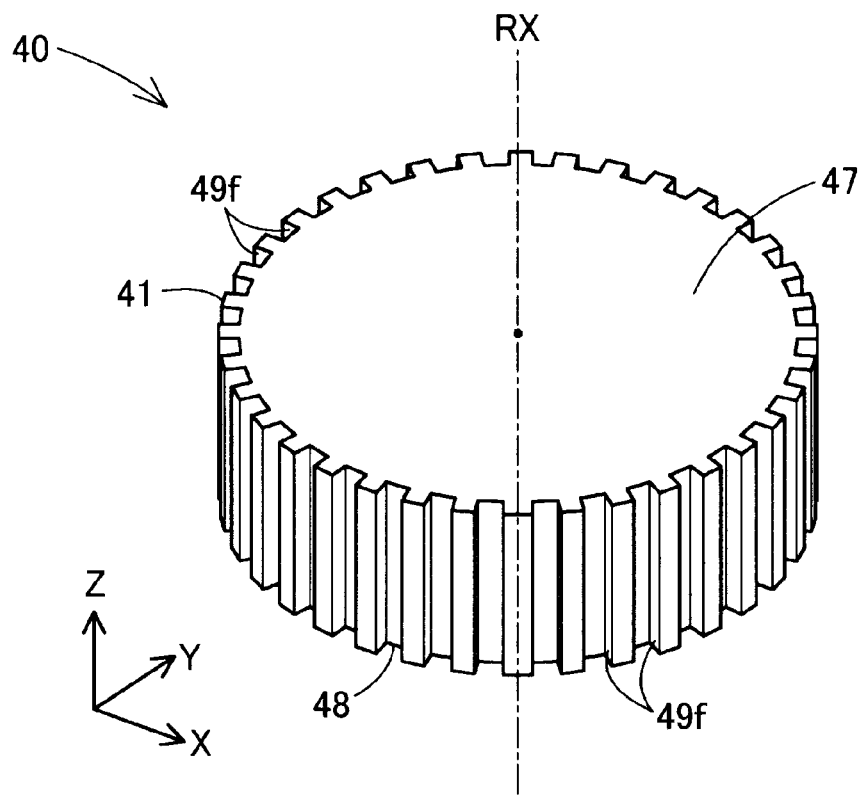
FIG. 14A is a schematic view illustrating a variation of a configuration of the stirring portion.
Figure 14B:
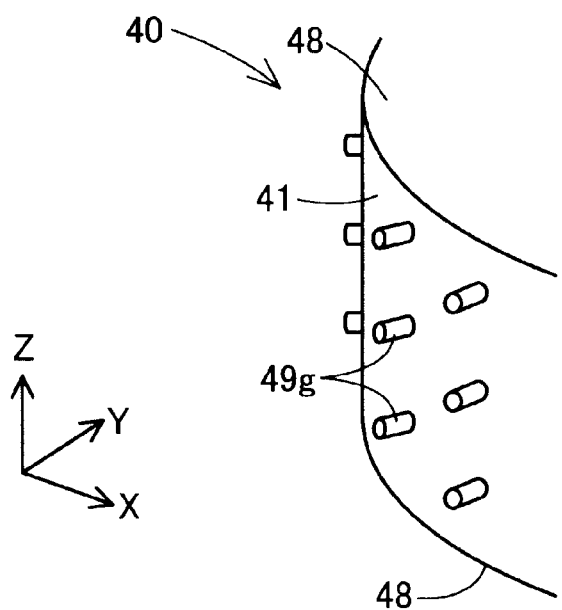
FIG. 14B is a schematic view illustrating a variation of a configuration of the stirring portion.
Figure 14C:
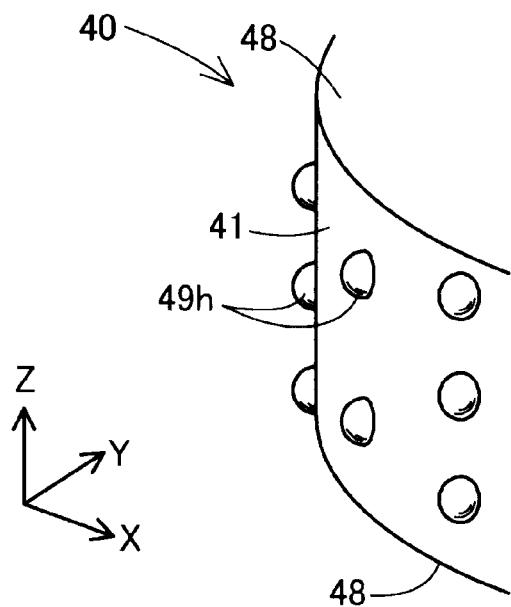
FIG. 14C is a schematic view illustrating a variation of a configuration of the stirring portion.
Figure 14D:
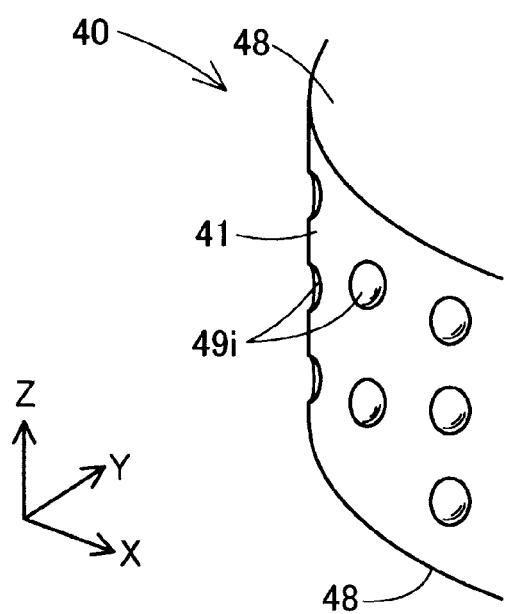
FIG. 14D is a schematic view illustrating a variation of a configuration of the stirring portion.

Stirring portions 49f, 49g, 49h, and 49i as another configuration example will be described with reference to FIGS. 14A to 14D. The stirring portion 49f illustrated in FIG. 14A is configured by finely arranging thin groove-like recessed portions extending in the axial direction of the flat screw 40 at intervals of approximately 1° to 15° in the circumferential direction of the flat screw 40. The appearance of the flat screw 40 is gear-like by having the stirring portion 49f. The stirring portion 49g illustrated in FIG. 14B is configured to include a plurality of columnar protruding portions which protrude in the radial direction of the flat screw 40 from the outer peripheral side surface 41 of the flat screw 40 and are disposed in the axial direction and circumferential direction of the flat screw 40. The stirring portion 49h illustrated in FIG. 14C is configured to include hemispherical protruding portions disposed in the axial direction and the circumferential direction of the flat screw 40 on the outer peripheral side surface 41 of the flat screw 40. The stirring portion 49i illustrated in FIG. 14D is configured to include hemispherical recessed portions disposed in the axial direction and the circumferential direction of the flat screw 40 on the outer peripheral side surface 41 of the flat screw 40. Even with the stirring portions 49f, 49g, 49h, and 49i of FIGS. 14A to 14D, the rotation of the flat screw 40 can stir the raw material MR in the material supply path 33A. In addition, with the stirring portions 49f, 49g, 49h, and 49i of FIGS. 14A to 14D, the pelletized raw material MR is prevented from being crushed by the collision with the stirring portions 49f, 49g, 49h, and 49i.

As described above, according to the material plasticizing device 10D of the fourth embodiment, the stirring of the stirring portions 49, 49a, 49b, 49c, 49d, 49e, 49f, 49g, 49h, and 49i suppress the clogging of the raw material MR in the material supply path 33A. In addition, according to the material plasticizing device 10D of the fourth embodiment and the shaping apparatus 100 provided with the material plasticizing device 10D, various effects described in the fourth embodiment and the first embodiment can be achieved.

5. Other Embodiments

The various configurations described in each of the above embodiments can be modified as follows, for example. Any of the other embodiments described below, similar to the above-described embodiments, is regarded as an example of an aspect for implementing the technology of the present disclosure.

(1) Other Embodiment 1

In each of the above embodiments, in the generation unit 30, a rotor other than the flat screw 40 may be used instead of the flat screw 40 for plasticizing the material. In each of the above embodiments, the material supply paths 33A, 33B, and 33C may not be formed to surround the entire outer periphery of the flat screw 40, and may be interrupted in the middle in the circumferential direction of the flat screw 40. In each of the above embodiments, the bottom surface 34 of the material supply paths 33A, 33B, and 33C may not be inclined with respect to the horizontal plane. In the material supply path 33B according to the above second embodiment, the width of the material supply path 33B may be configured to gradually decrease as separating from the coupling position CP in the rotation direction RD without the position of the upper wall surface 36 changing in the rotation direction RD.

(2) Other Embodiment 2

The configurations of the stirring portions 49, 49a, 49b, 49c, 49d, 49e, 49f, 49g, 49h, and 49i according to the above fourth embodiment may be applied to the material plasticizing devices 10B and 10C according to the second embodiment or the third embodiment. In the above fourth embodiment, the stirring portion may not be provided in the flat screw 40. The stirring portion may be configured, for example, to include a gear that is provided separately from the flat screw 40 and rotates in the material supply path 33A.

(3) Other Embodiment 3

The material plasticizing devices 10A, 10B, 10C, and 10D of the above embodiments may not be mounted on the shaping apparatus 100, and may be mounted on an apparatus using other plasticized material. The material plasticizing devices 10A, 10B, 10C, and 10D may be mounted on, for example, an injection molding apparatus. In this case, the communication hole 56 of the screw facing portion 50 is coupled to a cavity of a mold.

(4) Other Embodiment 4

In each of the above embodiments, the material supply paths 33A, 33B, and 33C may be coupled to the plurality of material supply sources 21. In this case, different types of materials may be supplied from the material supply sources 21 to the material supply paths 33A, 33B and 33C, and mixed in the material supply paths 33A, 33B and 33C or in the scroll groove 42 of the flat screw 40 to generate a shaping material. For example, the powder material serving as the main material described in the above embodiment and the solvent or binder added thereto may be supplied to the material supply paths 33A, 33B, and 33C in parallel from separate material supply sources 21.

6. Example of Aspect

The technology of the present disclosure is not limited to each of the above-described embodiments or examples, and can be realized by various aspects in the range which does not deviate from the gist. For example, the technology of the present disclosure can be implemented as the following aspects. In order to solve a portion or all of the problems to be achieved by the technology of the present disclosure, or to achieve a portion or all of the effects to be achieved by the technology of the present disclosure, the technical features in each of the above embodiments corresponding to the technical features in each aspect described below can be appropriately replaced or combined. In addition, unless the technical feature is described as essential in the present specification, the technical feature can be deleted as appropriate.

(1) According to a first aspect, there is provided a material plasticizing device including a rotor having a material introduction portion open on an outer peripheral side surface, and a groove forming surface on which a scroll groove kneading a material introduced from the material introduction portion is formed; a case that surrounds an outer periphery of the groove forming surface; a facing portion having a facing surface that faces the groove forming surface, a heater that heats the material in the scroll groove, and a communication hole through which the material plasticized by a heat of the heater flows; and a material supply source that stores the material, in which a coupling pipeline is formed in the case, a material supply path is formed by the case and the outer peripheral side surface of the rotor, and the material flows into the material introduction portion through the coupling pipeline and the material supply path.

According to the material plasticizing device of this aspect, since the material supply path is formed along the outer peripheral side surface of the rotor, the material can be continuously flowed into the scroll groove through the material introduction portion. Therefore, the supply amount of the material into the scroll groove can be prevented from varying in accordance with the rotation angle of the rotor, and the pressure variation in the scroll groove is suppressed. Therefore, the flow rate of the plasticized material flowing out from the communication hole can be prevented from varying.

(2) In the material plasticizing device of the above aspect, the material supply path may be formed so as to surround the outer periphery of the rotor.

According to the material plasticizing device of this aspect, the occurrence of pressure variation in the scroll groove during one rotation of the rotor is further suppressed.

(3) In the material plasticizing device of the above aspect, the bottom surface of the material supply path may be inclined to be positioned downward in the gravity direction as approaching the outer peripheral side surface of the rotor.

According to the material plasticizing device of this aspect, the material in the material supply path is guided by gravity toward the material introduction portion along the inclination of the bottom surface of the material supply path, so that the material is prevented from staying in the material supply path.

(4) In the material plasticizing device of the above aspect, the angle interposed by the bottom surface and the outer peripheral side surface of the rotor may decrease as separating from a coupling position between the material supply path and the coupling pipeline in a rotation direction of the rotor.

According to the material plasticizing device of this aspect, since the inclination angle of the bottom surface of the material supply path becomes steeper as the position separates from the coupling pipeline, the material can be prevented from staying in the region separated from the coupling pipeline in the material supply path.

(5) In the material plasticizing device of the above aspect, the width of the material supply path in a radial direction of the rotor may decrease as separating from the coupling position of the material supply path and the coupling pipeline in the rotation direction of the rotor.

According to the material plasticizing device of this aspect, the distance between the side wall surface of the material supply path and the material introduction portion decreases as separating from the coupling position with the coupling pipeline. Therefore, the material is likely to be guided to the material introduction portion as the position separates from the coupling position with the coupling pipeline, and the material can be prevented from staying in the material supply path.

(6) In the material plasticizing device of the above aspect, the material supply path may have a smaller cross-sectional area in the cross section perpendicular to the direction along the material supply path as separating from the coupling position with the coupling pipeline in the rotation direction of the rotor.

According to the material plasticizing device of this aspect, the space configured to store the material is reduced as the position in the material supply path separates from the coupling pipeline is reduced, so that the material can be prevented from staying in the region separated from the coupling pipeline in the material supply path.

(7) In the material plasticizing device of the above aspect, the rotor may be provided with the stirring portion that stirs the material in the material supply path when the rotor rotates.

According to the material plasticizing device of this aspect, since the movement of the material in the material supply path is facilitated by the stirring of the material in the material supply path, the material can be prevented from clogging or staying in the material supply path.

(8) In the material plasticizing device of the above aspect, the stirring portion may be configured to include the protruding portion protruding from the outer peripheral side surface of the rotor, or the recessed portion of the outer peripheral side surface.

According to the material plasticizing device of this aspect, the stirring of the material in the material supply path can be realized with a simple configuration.

The technology of the present disclosure can also be realized in various forms other than the material plasticizing device. For example, the present disclosure can be realized in the form of a three-dimensional shaping apparatus or an injection molding apparatus provided with a material plasticizing device, or a supply apparatus of material to a plasticizing unit that plasticizes the material by a rotor.

What is claimed is:

1. A material plasticizing device comprising:
a rotor that is generally columnar-shaped, the rotor having an upper surface and a lower surface outwardly opposite to each other, and an outer peripheral side surface, the outer peripheral side surface having a first part and a second part arranged in a height direction of the rotor, the first part being closer to the lower surface than the second part, the rotor including:
 a material introduction portion open on the outer peripheral side surface, the material introduction portion being formed by inwardly concaving of only the first part of the outer peripheral side surface; and
 a scroll groove provided in the lower surface of the rotor, the scroll groove being configured to knead a material introduced from the material introduction portion, the material introduction portion continuously connecting an end of the scroll groove;
a case that surrounds the outer peripheral side surface of the rotor;
a facing member having a facing surface that faces the lower surface of the rotor, the facing member including:
 a heater configured to heat the material in the scroll groove; and
 a communication hole through which the material plasticized by a heat of the heater flows; and
a material supply source that stores the material, wherein
a coupling pipeline is formed in the case,
a material supply path is formed by the case and the outer peripheral side surface of the rotor,
the material flows into the material introduction portion through the coupling pipeline and the material supply path,
a depth of the material introduction portion is larger than a depth of the scroll groove, and
the depth of the scroll groove adjacent to the material introduction portion is larger than the depth of the scroll groove adjacent to a center area of the lower surface of the rotor.

2. The material plasticizing device according to claim 1, wherein
the material supply path surrounds the outer peripheral side surface of the rotor.

3. The material plasticizing device according to claim 1, wherein
a bottom surface of the material supply path is inclined to be positioned downward in a gravity direction as approaching the outer peripheral side surface of the rotor.

4. The material plasticizing device according to claim 3, wherein
an angle interposed by the bottom surface and the outer peripheral side surface of the rotor decreases as separating from a coupling position between the material supply path and the coupling pipeline in a rotation direction of the rotor.

5. The material plasticizing device according to claim 1, wherein
a width of the material supply path in a radial direction of the rotor decreases as separating from a coupling position of the material supply path and the coupling pipeline in a rotation direction of the rotor.

6. The material plasticizing device according to claim 1, wherein
the material supply path has a smaller cross-sectional area in a cross section perpendicular to a direction along the material supply path as separating from a coupling position of the material supply path and the coupling pipeline in a rotation direction of the rotor.

7. The material plasticizing device according to claim 1, wherein
the rotor is provided with a stirring portion that stirs the material in the material supply path when the rotor rotates.

8. The material plasticizing device according to claim 7, wherein
the stirring portion is configured to include one of a protruding portion protruding from the outer peripheral side surface of the rotor or a recessed portion of the outer peripheral side surface of the rotor.

* * * * *